United States Patent
Wong et al.

(10) Patent No.: US 10,769,339 B1
(45) Date of Patent: Sep. 8, 2020

(54) LOCAL BAND-TO-BAND-TUNNELING MODEL FOR TCAD SIMULATION

(71) Applicant: Synopsys, Inc., Mountain View, CA (US)

(72) Inventors: Hiu Yung Wong, Cupertino, CA (US); Rimvydas Mickevicius, Fremont, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/535,523

(22) Filed: Aug. 8, 2019

Related U.S. Application Data

(60) Provisional application No. 62/716,426, filed on Aug. 9, 2018.

(51) Int. Cl.
*G06F 30/367* (2020.01)
*G06F 30/392* (2020.01)
(Continued)

(52) U.S. Cl.
CPC .......... *G06F 30/367* (2020.01); *G06F 30/392* (2020.01); *G06F 2111/04* (2020.01); *G06F 2111/10* (2020.01); *G06F 2111/20* (2020.01)

(58) Field of Classification Search
CPC ...... G06F 30/367; G06F 30/39; G06F 30/392; G06F 30/398; G06F 2011/04; G06F 2011/10; G06F 2011/20
(Continued)

(56) References Cited

U.S. PATENT DOCUMENTS 9,536,026 B2    1/2017  Joshi et al.
2009/0276737 A1* 11/2009  Ku ................. G06F 30/367
                                                716/136
(Continued)

OTHER PUBLICATIONS

Hurkx, G.A.M., et al. article entitled "A New Recombination Model for Device Simulation . . .", IEEE Transactions of Electron Devices, vol. 39, No. 2, Feb. 1992, 8 pages.
(Continued)

*Primary Examiner* — Paul Dinh
(74) *Attorney, Agent, or Firm* — Bever, Hoffman & Harms, LLP

(57) ABSTRACT

An improved local modeling function for estimating band-to-band tunneling currents $R_{BBT}$ in nanodevices and other low-voltage circuit elements during TCAD simulation, the model being represented by the equation:

$$R_{BBT} = -B|F|^\sigma = \exp\left(-\frac{F_0}{|F|}\right)g$$

where terms B, F, $F_0$ and σ correspond to conventional terms used in Hurkx-based equations, and the term g is an exponential factor determined by the equation:

$$g = \left(\frac{F - F_1}{F_1}\right)^{1.5}$$

where the term $F_1$ is the built-in electric field at a selected cell/point determined by the equation:
(Continued)

---

```
                                                    ,-210
GENERATE TCAD MODEL (VIRTUAL REPRESENTATION)
OF TARGET CIRCUIT ELEMENT INLCUDING ARRAY/
MATRIX OF CELLS WITH ASSOCIATED POSITIONAL AND
            MATERIAL DATA
                    |
                    v                               ,-220
   SIMULATE OPERATION OF THE CIRCUIT ELEMENT
INCLUDING APPLYING SIMULATED EXTERNAL FORCE TO
      SELECTED CELL OF THE TCAD MODEL
                    |
                    v                               ,-230
  GENERATE BBT CURRENT ESTIMATE R_BBT UTILIZING
       LOCAL MODELING FUNCTION INCLUDING AN
  EXPONENTIAL FACTOR DETERMINED BY A DIFFERENCE
   BETWEEN THE APPLIED EXTERNAL VOLTAGE AND A
      BUILT-IN ELECTRIC FIELD AT THE SELECTED CELL
```

$$F_1 = \max\left(\tilde{F}_1, \sqrt{C\frac{2qE_g N_{net}}{\varepsilon}}\right)$$

where $\tilde{F}_1$ is the built-in electric field at zero bias, q is fundamental electronic charge, C is a fitting parameter, $E_g$ is bandgap, $N_{net}$ is doping concentration, and E is dielectric constant. At low applied fields (F~$F_0$) the factor g biases the improved model toward the zero-field/zero-current origin in a way that closely matches non-local model results. At higher applied fields the factor g has less influence and the model is controlled by the conventional terms.

20 Claims, 9 Drawing Sheets

(51) Int. Cl.
  *G06F 111/04* (2020.01)
  *G06F 111/10* (2020.01)
  *G06F 111/20* (2020.01)

(58) Field of Classification Search
  USPC .................................... 703/2; 716/106, 136
  See application file for complete search history.

(56) References Cited

U.S. PATENT DOCUMENTS

2014/0032188 A1* 1/2014 Manouvrier .......... G06F 30/367
  703/2
2014/0288898 A1* 9/2014 Fukuda ................. G06F 30/367
  703/2

OTHER PUBLICATIONS

Peng, Jack Zezhong et al., article entitled "Accurate Simulation on Band-to-Band Tunneling induced Leakage . . . ", Solid-State and Integrated Circuit Technology, Nov. 1995, 4th Int'l Conference, 3 pages.

Schenk, A., article entitled "Rigorous Theory and Simplified Model of the Band-to-Band Tunneling in Silicon", Solid-State Electronics, vol. 36, No. 1, pp. 19-34 (17 pages), 1993.

Shen, Chen, et al., article entitled "A robust non-local algorithm for band-to-band tunneling simulation . . . ", Solid-State Electronics 57, 2011, pp. 23-30 (8 pages).

* cited by examiner

LOCAL BAND-TO-BAND-TUNNELING MODEL FOR TCAD SIMULATION

RELATED APPLICATION

This application claims priority from U.S. Provisional Patent Application 62/716,426, entitled "A New Local Band-to-Band-Tunneling (BTBT) Model for More Accurate and Speedy TCAD Simulations", which was filed on Aug. 9, 2018, and is incorporated by reference herein.

COPYRIGHT NOTICE

The assignee of this patent document has no objection to the facsimile reproduction by anyone of the patent document itself, or of the patent application, as it appears in the files of the United States Patent and Trademark Office, but otherwise reserves all rights whatsoever in any included works of authorship protected by copyright.

SPECIFICATION—DISCLAIMER

*In the following Background, Summary, and Detailed Description, headings should not be construed as necessarily limiting. In the following Background, Summary and Detailed Description, the citation or identification of any publication does not signify relevance or status as prior art for any of the claimed or described embodiments. Paragraphs for which the text is all italicized signifies text that is common to multiple Synopsys patent specifications.*

FIELD OF THE INVENTION

This invention relates generally to computer simulation of physical structures generated by semiconductor fabrication processes, and more specifically to models utilized during TCAD simulation of low-voltage circuit elements that exhibit significant band-to-band tunneling (e.g., nanodevices such as FinFETs, nanowire transistors and nanosheet/2D-material devices).

BACKGROUND OF THE INVENTION

Electronic design automation (EDA) software tools are utilized by circuit developers to design and fully test their circuit designs before manufacturing (i.e., fabricating or otherwise producing) physical circuit structures. As used herein, the terms "IC design" and "circuit design" refer to a software-based description of an integrated circuit (IC) from an initial circuit concept (general system level description) to a final transistor-level description. In contrast, the terms "IC/circuit structure" and "IC/circuit device" generally refer to a physical integrated circuit (IC) device that is fabricated on a semiconductor substrate using a layout (technology) file defined by the final (transistor-level description) circuit and a selected semiconductor (e.g., CMOS) fabrication system. Modern EDA software tools typically include a suite of toolsets (tool types) that seamlessly integrate different operations associated with the design/development of a circuit design, such as system and logic design toolsets, synthesis toolsets, toolsets for various types of testing and verification, toolsets for layout and routing, and mask preparation toolsets. Because modern circuits (e.g., System-on-Chip devices) can include billions of transistors and other circuit elements, EDA tools have become essential in the arrangement and interconnection of the multiple circuit types of modern circuit designs. Moreover, because the post-fabrication discovery of design flaws can cause significant production delays and significantly affect profitability of a circuit device, EDA tools have become essential in the pre-fabrication testing/verification of modern circuit designs. That is, without EDA software tools, the efficient generation a modern circuit from concept to physical circuit device would be practically impossible.

Technology Computer-Aided Design (TCAD) tools/toolsets represent one type of EDA test/verification tool that allows circuit designers and device/process/integration engineers to model and simulate physics-based descriptions of specific circuit elements utilized in their circuit designs in order to verify that the operational characteristics of the specific circuit elements are compatible with design constraints. TCAD tools are distinguished from other EDA test/verification tools in that they generate test/verification data by simulating the operation of circuit elements using physics-based 1D, 2D or 3D models of the circuit elements. By way of comparison, functional verification tools are utilized to verify that the overall logic of a circuit design conforms to specifications, and formal verification tools are utilized to prove/disprove the correctness of intended algorithms underlying a circuit design, where neither of these EDA test/verification tool types utilize physics-based operations physics-based 2D or 3D models of circuit elements used in the corresponding circuit design.

TCAD modeling generally involves generating a virtual physics-based representation of a specific circuit element including material characteristics (e.g., type and doping profiles) and feature sizes. For example, a TCAD model may be generated by way a computer-implemented fabrication process in which a selected circuit element is virtually fabricated using associated layout (technology) file information and processing details of a selected fabrication process, thereby providing the model with virtual versions of the various material structures and doped semiconductor regions that would be physically produced if the circuit element was actually fabricated using the layout file and selected fabrication process. An exemplary two-dimensional (2D) TCAD model is described below with reference to FIG. 11B, and an exemplary three-dimensional (3D) TCAD model is described below with reference to FIG. 13B. As described in additional detail below, each TCAD model includes multiple cells (unit elements) that collectively replicate the spatial and compositional characteristics of a corresponding physical circuit element. That is, the multiple cells are arranged in array or matrix such that positional data of the outermost cells corresponds to the spatial boundaries of the corresponding physical circuit element, and each cell includes compositional data that replicates the material contents of a corresponding portion/region of the physical circuit element. As explained in additional detail below, each cell also includes data fields configured to store simulation data (e.g., a field parameter indicating an electric field generated at the cell's location in response to applied stimulus). Those skilled in the art will recognize that the exemplary models are greatly simplified for brevity.

The generation of a simplified 2D model (virtual representation) is described with reference to FIGS. 11A and 11B. FIG. 11A is a cross-section 2D of a standard MOSFET 50 including a polycrystalline silicon (Poly-Si) gate structure 51, a silicon-dioxide ($SiO_2$) gate oxide layer 52 and a silicon substrate 53 including an N-doped source region S and an N-doped drain region D. FIG. 11B is a graphical depiction of a simplified 2D model 60 that may be generate by a TCAD tool to replicate MOSFET (circuit element) 50. To provide a physics-based virtual representation of MOSFET 50, model 60 is generated with an array of 2D cells that represent corresponding physical portions (e.g., square-shaped 2D regions) of MOSFET 50, where each cell includes 2D positional data and material data that characterize the spatial location and composition of its corresponding physical portion (2D region) of MOSFET 50. For example, model 60 is generated such that, for a given cell E1 to virtually represent an associated portion (2D region) R1 located in gate structure 51 of MOSFET 50, cell E1 is generated with positional data X1,Y1 that corresponds with associated portion R1, and includes material data (e.g., N-doped Poly-Si) describing the composition of the gate material that occupies associated portion R1. Similarly, cell E2 of model 60 is generated with positional data X2,Y2 and associated material data (e.g., $SiO_2$) that correspond with associated portion R2 located in gate oxide layer 52, and cell E2 of model 60 includes positional data X3,Y3 and associated material data (e.g., N-doped Si) that correspond with associated portion R3 located in drain region D. Each 2D cell also includes additional parameter data fields (described below).

The generation of a simplified 3D model is described with reference to FIGS. 12A and 12B. FIG. 12A is a perspective 3D view showing a single-fin FinFET 70 including a poly-crystalline silicon (Poly-Si) gate structure 71, a silicon or silicon-germanium (SiGe) fin structure including a source region S and an N-doped drain region D separated by a channel region that passes under/through gate structure 71, a gate insulator layer 72 and a substrate 73. FIG. 12B is a graphical depiction of a simplified 3D model 80 that is generated using known techniques to provide a virtual representation of FinFET 70, whereby model 80 includes a matrix of 3D cells that represent corresponding physical portions (e.g., cube-shaped 3D regions) of FinFET 70, where each cell includes 3D positional data and associated material data that define a corresponding volumetric portion/region of FinFET 70. For example, cell E4 of model 80 includes 3D positional data X4,Y4,Z4 and material data (e.g., N-doped Poly-Si) that correspond with associated portion/region R4 located in gate structure 71 of FinFET 70, and cell E5 of model 80 includes positional data X5,Y5,Z5 and associated material data (e.g., SiGe) that correspond with associated portion R5 located in oxide layer 72. Each 3D cell also includes additional parameter data fields (described below).

TCAD simulation is typically divided into two simulation types: process simulation and device simulation. TCAD process simulation involves simulating various processes (e.g., etching, deposition, oxidation, nitridation, silicidation, epitaxial growth, dopant implantation diffusion, activation, and clustering) that are performed during the fabrication of a given circuit device using a selected fabrication process and an associated layout file information. In contrast, TCAD device simulation involves simulating charge carrier (i.e., electrons, holes and sometimes ions) transport through an already-formed TCAD model. Because the primary thrust of the present invention pertains to TCAD device simulation, additional detail regarding TCAD process simulation are omitted herein for brevity, and all subsequent references to TCAD simulation are understood to mean TCAD device simulation unless otherwise specified.

TCAD (device) simulation generally involves virtually subjecting a TCAD model to various simulated operational and environmental conditions that will be applied to the corresponding physical circuit element (e.g., various simulated gate/drain/source voltage levels and various simulated operating temperatures), and then determining and analyzing the model's performance (e.g., the flow of charge carriers) under the simulated conditions. As mentioned above, the goal of TCAD simulation is physics-based replication of the operational characteristics occurring in the corresponding physical circuit element when subjected to actual operational and environmental conditions. In general, the actual operational characteristics of all physical circuit elements (e.g., charge carrier mobility, saturation velocity, impact ionization rate, tunneling currents, etc.) are dependent on quantifiable physical characteristics, whereby these physical characteristics may be quantified using associated parameters. For example, the crystal lattice temperature of a given physical circuit element portion/region during actual operation may be quantified using a corresponding parameter T. Similarly, charge carrier concentrations in the given region may be quantified using parameters n and p, doping concentration may be quantified using parameters $N_d$ and $N_a$, and an applied electric field may be quantified using a parameter F. All of these characteristics/parameters (T, n, p, $N_d$, $N_a$, F) may be spatially distributed across the physical domain occupied by a given physical circuit element (i.e., the value of each characteristic/parameter may be different in different portions/locations within the volume occupied by a circuit element). Accordingly, each cell of a TCAD model includes a corresponding set of parameters (T, n, p, $N_d$, $N_a$, F) that quantify corresponding localized characteristics occurring at the cell's location during TCAD simulation. For example, referring to 2D model 60 (FIG. 11B), current through MOSFET 50 (FIG. 11A) in a turned-on operating condition may be estimated by applying a virtual gate voltage to cell E1 while maintaining a suitable virtual drain voltage on cell E3, and then calculating the resulting charge carrier concentration parameters p and n in one or more cells associated with circuit device portions located in source region S. In other words, TCAD simulation involves performing computer-implemented numerical method techniques that calculate cause/effect-type, physics-based changes in the parameters of selected cells in response to the simulated conditions, whereby the TCAD model's simulated reactions to the applied simulated conditions approximate actual reactions of the corresponding physical circuit elements. By facilitating physics-based analysis of different circuit element types and sizes (i.e., by way of simulating the operations of different TCAD models describing the different types/sizes), TCAD tools allow circuit designers to identify specific circuit element configurations that are optimized for a given circuit design.

Modern TCAD tools typically provide various options that allow users to maximize simulation result accuracy at the cost of a longer processing time (i.e., the total time required for a given TCAD model to generate/converge on a solution), or to minimize processing time at the cost of lower result accuracy. As illustrated by 2D model 60 (FIG. 11B), one such option is the ability to perform 2D simulation on a cross-sectional "slice" of a given 3D model, which minimizes a given TCAD model's processing time of by way of reducing the number of simulated cells, but does not provide the result accuracy that would be provided by performing 3D simulation using the entire 3D model. Another option is the ability to define models using different cell resolutions, with a high-resolution model (e.g., one atom per cell) providing more accurate results but requiring substantially more processing time than that required for a corresponding low-resolution model (e.g., 10,000 atoms per cell). Ideally, a circuit designer chooses options that provide sufficiently accurate simulation results while minimizing processing time.

A third option provided by some TCAD tools for reducing processing time in exchange for simulation result accuracy is the option of using either local model simulation techniques (aka, local models) or non-local model simulation techniques (aka, non-local models). Local and non-local model simulation techniques are similar in that both involve computer-implemented formulas that are selectively utilized during TCAD simulation to determine a corresponding physical operational characteristic (e.g., charge carrier tunneling probability) at a given space-point location (e.g., occurring in a selected TCAD model cell). Local and non-local model simulation techniques differ in that local model simulation techniques only utilize operational characteristics (parameter values) at a given space-point location (e.g., occurring in a selected TCAD model cell) to calculate the desired physical operational characteristic. For example, referring to FIG. 13B, a 2D local model simulation technique may utilize only parameter data V22 of a selected TCAD model cell E22 to calculate a charge carrier tunneling probability at the space-point location of cell E22. In contrast, non-local model simulation techniques utilize operational characteristics/parameters simultaneously occurring in multiple space-point locations (e.g., using parameter values stored in the given cell and one or more neighboring cells) to calculate the desired physical operational characteristic. For example, referring to FIG. 13B, an exemplary 2D non-local model simulation technique for determining an electron tunneling probability at cell E22 may depend on an integral of electric field parameter values V31. Similarly, referring to 3D model 90 shown in FIGS. 14A and 14B, a 3D local model simulation technique typically utilizes parameters stored in conjunction with a selected cell E6, whereas a non-local model simulation technique may be determined by associated forces generated in any of the twenty-six adjacent cells surrounding selected cell E6 (or any cells located outside of these adjacent cells). By limiting data processing associated with local model simulation techniques to only the parameter data of the selected cell, local modeling simulation techniques can be performed using a relatively small number of calculations that require relatively a short amount of processing time, and typically achieve convergence on a solution. However, although local modeling simulation techniques may provide sufficiently accurate data for some physical operational characteristics of some circuit elements, the results are typically too inaccurate for analyzing nanodevices and other low-voltage circuit cells produced using cutting-edge processing technologies. That is, as the supply voltages cannot be scaled accordingly without jeopardizing the circuit performance, increased electric fields inside the nanodevices generate large electric field changes, which produce non-local and hot-carrier effects that can dominate nanodevice performance. In contrast, non-local modeling techniques account for these non-local and hot-carrier effects by way of calculating both 'local' and 'non-local' driving forces, and therefore provide higher accuracy, but require substantially longer processing times than local modeling techniques, and sometimes fail to converge on a solution.

Tunneling leakage is a circuit element operational characteristic that has commanded increased attention as semiconductor processing technologies moves toward nanodevices and other circuit elements having increasingly smaller feature sizes and lower operating voltages. Referring to FIG. 15, tunneling leakage refers to the gradual transfer of electrical energy in the form of charge carriers (e.g., electrons or holes) across a boundary normally viewed as insulating, such as the small but undesirable gate-to-drain current generated in turned-off transistors, where tunneling current increases when the forward voltage exceeds the valence band edge Ev or when the reverse voltage exceeds the conductance band edge Ec. Tunneling leakage was typically considered insignificant in early circuit elements produced using older technologies (e.g., CMOS MOSFETs) because the dielectric materials (e.g., silicon dioxide) used in these circuit elements produced relatively wide bandgaps for the applied operating voltages and feature sizes. As semiconductor processing evolved to provide circuit elements with smaller features sizes and lower operating voltages, the relevance of tunneling leakage began to increase due to higher source/drain doping concentrations. The relevance of tunneling leakage further increased with the recent development of various nanodevices (e.g., FinFETs, nanowires and 2D material transistors having nanometer-scale feature sizes), which are fabricated using cutting-edge semiconductor processing technologies that utilize lower bandgap materials such as SiGe.

As with other simulation measurements, conventional TCAD tools typically include both local modeling BBT measurement techniques and non-local modeling BBT measurement techniques. The non-local modeling techniques include dynamic non-local path band-to-band models that account for the non-local generation of electrons and holes caused by direct and phonon-assisted tunneling processes. As with other non-local measurements, a benefit associated with conventional non-local BBT measurement techniques is that they provide tunneling leakage estimates that match well with actual measurements. However, non-local BBT measurement model require a long time to reach a solution (i.e., converge), and fail to converge about 30% of the time, which may be attributed to the complexity of the equations that need to be solved. That is, non-local BBT simulation models utilize partial differential equations that describe electron and hole transport in the modeled semiconductor device, and are solved by discretizing them over a special mesh covering the simulation domain and linearizing them, and then solving the resultant system of linear equations using usual matrix techniques. Non-local BBT measurement models generate resultant matrices that are denser with more non-zero non-diagonal cells than local BBT measurement models, and such denser matrices are more difficult to solve than less dense matrices, and often fail to converge on (achieve) solution.

Most local BBT measurement models utilized in TCAD simulation are based on the Hurkx equations described in "A New Recombination Model For Device Simulation Including Tunneling", IEEE Transactions on Electron Devices, Volume 39 Issue 2, February 1992, by G. Hurkx, D. Klaassen and M. Knuvers. In this paper the authors present a recombination model which takes into account band-to-band tunneling in reverse-bias and trap-assisted tunneling in both forward and reverse bias. The recombination model describes a total net recombination rate given by the following Equation 1:

$$R = R_{TRAP} + R_{BBT} \quad \text{(Equation 1)}$$

where $R_{TRAP}$ is the contribution of transitions via traps (including the conventional Shockley-Read-Hall recombination mechanism) and $R_{BBT}$ is the band-to-band tunneling contribution. The trap-assisted tunneling effect $R_{TRAP}$ is described by an expression that for weak electric fields reduces to the conventional Shockley-Read-Hall (SRH) expression for recombination via traps. The band-to-band tunneling contribution is found to be important at room temperature for electric fields larger than $7*10^5$ V/cm.

Hurkx et al. teach that for dopant concentrations above $5*10^{17}$ cm$^{-3}$ or, equivalently, for breakdown voltages below approximately 5V, the reverse characteristics are dominated by band-to-band tunneling. The present invention addresses only the band-to-band tunneling portion of Equation 1, and therefore the contribution of transitions via traps is omitted from the following discussion. That is, a model suitable for calculating total net recombination rates according to Equation 1 may utilize the approach for determining the trap-assisted tunneling effect $R_{trap}$ taught by Hurkx et al. in combination with the present invention set forth below. Other local BBT measurement models utilized in TCAD simulation, such as those based on Schenk's model (see A. Schenk, "Rigorous Theory and Simplified Model of the Band-to-Band Tunneling in Silicon," Solid-State Electronics, vol. 36, no. 1, pp. 19-34, 1993), have the same problems described below with reference to Hurkx-based local models, and therefore are not discussed in detail herein for brevity.

The Hurkx model for determining band-to-band tunneling contribution $R_{BBT}$ is copied below as Equation 2, and represents a conventional local modeling technique typically utilized to determine local Band-to-Band-Tunneling (BBT) during TCAD device simulation:

$$R_{BBT} = -B \cdot |F|^{\sigma} \cdot D(F, E, E_{fn}, E_{fp}) \cdot \exp(-F_0/(|F|)) \quad \text{(Equation 2)}$$

where the term F is the applied electric field, $F_0$ is a temperature-dependent bandgap force that is proportional to $E_g^{3/2}$ where $E_g$ is the bandgap and is given the value $1.9 \times 10^7$ V/cm at room temperature), and B is a temperature-independent pre-factor having a value of $4 \times 10^{14}$ cm$^{-1/2} \cdot$V$^{-5/2}$. The term $D(F, E, E_{fn}, E_{fp})$ is utilized to adjust the Hurkx equation for zero and reverse bias in the manner explained below with reference to FIG. 16. In the exponential exp($-F_0/(|F|)$), the term $F_0$ is proportional to $E_g^{3/2}$, where $E_g$ is the bandgap, whereby $F_0$ depends on temperature due to the temperature dependence of the bandgap. As currently understood by the inventors, all Hurkx-based local modeling techniques utilized by conventional TCAD tools to estimate BBT currents are based on Hurkx Equation 2.

FIG. 16 is a graph showing exemplary BBT estimates generated by optional conventional local and non-local modeling techniques provided by a conventional TCAD tool for an arbitrary TCAD model, where the solid-line curve indicates characteristic BBT estimates generated by the conventional non-local modeling technique, and the dashed-line curves shows corresponding BBT estimates generated using the optional Hurkx-based local modeling technique. As indicated by the solid-line curve, characteristic BBT current estimates generated by conventional non-local modeling technique produce a zero BBT current level when the reverse bias field F is zero, a relatively sharp increase in BBT current as the reverse bias field F increases from zero to a relatively low value Fa, a somewhat stable region in which BBT current levels remain substantially constant between relative low value Fa and an intermediate reverse bias field value Fb, and then a sharp increase in BBT current as the reverse bias field F increases above intermediate value Fb. As indicated by the two dashed-line curves, characteristic BBT current estimates generated by conventional Hurkx-based local modeling techniques typically deviate significantly from results generated by non-local modeling techniques for reasons explained below.

As understood in the art, BBT current estimates generated by a non-local TCAD modeling techniques are significantly more accurate (i.e., substantially identical to actual physical measurements) than those generated by Hurkx-based local TCAD modeling techniques. Accordingly, the solid-line curve indicating non-local TCAD modeling results in FIG. 16 (and in other figures referenced herein) are assumed to represent BBT currents generated in actual circuit elements when subjected to a range of applied reverse bias field forces, and the deviation of the dashed-line curves from the solid-line curve depicts corresponding relative error amounts inherent in BBT current estimates generated by Hurkx-based local TCAD modeling techniques. Due to the depicted deviation, one might conclude that all TCAD BBT estimates would be performed using non-local modeling techniques. However, as explained above, non-local modeling techniques require substantially longer processing times in comparison to local modeling techniques, and it is understood in the art that the failure rate of conventional TCAD BBT non-local modeling techniques is approximately 30%. Moreover, as indicated by the single-dot-dash line in FIG. 16 (labeled HURKX1 for reasons explained below), Hurkx-based local modeling techniques can provide acceptably accurate estimates for intermediate to high reverse bias field strengths. Accordingly, because local modeling techniques require substantially less processing time than non-local models and reliably converge on a solution, design engineers often utilize the Hurkx-based local modeling option provided by a given TCAD tool to perform various verification functions.

A growing problem associated with TCAD simulation is that conventional Hurkx-based local modeling techniques are not able to estimate BBT currents in nanodevices and other circuit elements fabricated using cutting-edge semiconductor processing technologies. As explained above, the nanometer-scale feature size and low operating voltages of cutting-edge semiconductor fabrication processes result in circuit devices that undergo very low reverse bias fields (e.g., in the range between zero and value Fa in FIG. 16), and the Hurkx Equation 2 (above) requires a change to the value of term $D(F, E, E_{fn}, E_{fp})$ at these low reverse bias field levels. That is, curve HURKX1 (single-dot-dashed line in FIG. 16) represents BBT current values generated using Hurkx Equation 2 with term D set to a value of positive-one (+1). As indicated in FIG. 16, this D=1 setting causes the resulting BBT current values of curve HURKX1 to map relatively accurately with the solid-line values associated with non-local modeling results. However, a problem with Hurkx Equation 2 is that, when term D is equal to one, curve HURKX1 does not terminate at the zero-current origin at zero reverse bias field values. In order to address this issue, the D term in Hurkx Equation 2 is changed from positive-one to negative-one (-1) at low below reverse bias field values (e.g., below value Fa in FIG. 16), whereby the Hurkx Equation 2 generates estimated BBT current values indicated by curve HURKX2 (double-dot-dash line) in FIG. 16, which are shifted lower from those of curve HURKX 1 consistent with those. That is, changing the value of term D to negative-one at low reverse bias field values causes the Hurkx Equation 2 to produce a zero-current estimate at zero reverse bias field values, and arguably provides sufficiently accurate estimates for very small reverse bias field values. However, as depicted in FIG. 16, the remaining values of curve HURKX2 (including a large portion of the region between zero and reverse bias field value Fa) are significantly different from those generated by the corresponding non-local modeling techniques. That is, while conventional Hurkx-based local modeling techniques arguably remain suitable for TCAD simulations involving circuit elements produced using older processing flows, they are increasing problematic when applied to nanodevices and other circuit elements fabricated using cutting-edge semiconductor processing technologies.

What is needed is a simulation modeling technique that provides improved BBT current estimates (i.e., more accurate in comparison to conventional local modeling techniques) during the TCAD simulation of low-voltage circuit elements (e.g., nanodevices or generated using cutting-edge fabrication processes) that overcomes the deficiencies of the conventional approaches set forth above. What is particularly needed is TCAD simulation modeling technique exhibiting the low-processing-time and reliable convergence characteristics of conventional local modeling techniques, and also provides estimated BBT current data having an accuracy that is closer to that generated by conventional non-local modeling techniques.

SUMMARY OF THE INVENTION

The claims signify a brief description of one or more of the innovations, embodiments, and/or examples found within this disclosure.

The present invention is directed to a local modeling function and associated method for generating BBT current estimates during TCAD simulation of circuit elements (e.g., nanodevices), wherein the local modeling function utilizes a novel exponential factor, in combination with additional terms used in conventional (e.g., Hurkx-based) local BBT modeling functions, to generate relatively accurate BBT current estimates while maintaining the reliable convergence associated with conventional local modeling techniques.

According to an aspect of the invention, the value produced by the novel exponential factor is determined (at least in part) for a selected cell/location of a TCAD model by calculating a difference between an external electric field and a built-in electric field generated at the selected cell's location within the TCAD model. That is, the present inventors observed that BBT currents drop to zero at a given point/cell of a low-voltage circuit element when a level of the external electric field at the given point/cell decreases to (becomes equal with or less than) the built-in electric field generated at the given point/cell. The present inventors also recognized that both the external electric field and a built-in electric field at a given point/cell may be accurately calculated for all low-voltage circuit element configurations using local TCAD modeling techniques (e.g., by calculating the built-in electric field generated at the selected cell's location using position data and material data associated with the TCAD model cells disposed adjacent to the selected cell, for example, using known techniques). Accordingly, the novel exponential factor facilitates improved BBT current estimates at low voltages (e.g., from 0V to −1V) by way of implementing the exponential factor in the improved local BBT modeling function such that the BBT current estimate generated by the improved local BBT modeling function is zero when a level of the external electric field is equal to (or less than) a level of the built-in electric field.

According to another aspect of the invention, the novel exponential factor is further characterized in that the difference between the external electric field and the built-in electric field at the selected cell is raised to an exponential power greater than one. By configuring the novel exponential factor such that the calculated difference is raised to an exponential power greater than one, the inventors determined that BBT current estimate generated by the improved local BBT modeling function were more closely aligned with results generated by non-local BBT modeling functions (i.e., in comparison to results generated by conventional Hurkx-based local BBT modeling functions).

By operably implementing the novel exponential factor mentioned above, the present invention provides an improved local BBT modeling function that generates more accurate BBT current estimates at low operating voltages (i.e., in comparison to conventional Hurkx-based local models) while exhibiting total processing times and convergence reliability that are comparable with conventional local BBT modeling functions, thereby allowing development/verification engineers to efficiently optimize and verify electrical behavior of circuit low-voltage elements utilized in their circuit designs. Moreover, because the novel exponential factor facilitates accurate low-voltage BBT current estimates that are element-specific (i.e., because the built-in electric field utilized by the novel exponential factor is determined in accordance with the specific 1D/2D/3D configuration and associated cell composition of a given TCAD model), the present invention enables device/process/integration engineers to efficiently analyze new low-voltage circuit element concepts for which fabrication processes may not yet be defined. Accordingly, the improved local BBT modeling function of the present invention provides a novel and useful TCAD simulation modeling technique for low-voltage circuit elements that exhibits the low-processing-time and reliable convergence characteristics of conventional local modeling techniques, while also providing improved (more accurate) BBT current estimates than those generated by conventional local modeling techniques.

According to an embodiment, the novel exponential factor is determined using the equation:

$$g = \left(\frac{F - F_1}{F_1}\right)^x$$

where g is the exponential factor value, F is the external electric field applied to the selected cell, $F_1$ is the built-in electrical force at the selected cell, and the exponent power x has a value in the range of one to three. The inventors determined that dividing the difference between the total applied force and built-in electric field (i.e., "F−$F_1$") by the built-in electric field value $F_1$, and then raising the divided difference to a power in the range of one to three provided results that agreed with corresponding non-local model results. In a specific embodiment, the exponent power x is given a value of one-and-one-half (i.e., x=1.5), which was provided results that most closely agreed with corresponding non-local model results in measurements involving Fin-FETs, but the inventors believe another exponent power between one and three may be used to provide better results when applied to other low-voltage circuit elements).

According to another embodiment, the built-in electric field $F_1$ utilized in the exponential factor g is determined by the maximum function:

$$F_1 = \max\left(\tilde{F}_1, \sqrt{C\frac{2qE_gN_{net}}{\varepsilon}}\right)$$

where $\tilde{F}_1$ is a built-in electric field occurring at the selected cell at zero bias, C is a fitting parameter determined by at least one of a structural configuration and an element type of the modeled circuit element, $E_g$ is a bandgap value of said selected element, $N_{net}$ is a doping concentration of the corresponding material located at said selected cell, and ε is the dielectric constant of the corresponding material located at the selected cell. Fitting parameter C is a novel term that was conceived when the inventors realized that 3D geometries have complicated electrostatic solutions and found that that fitting parameter C may be utilized to adjust for different types of simulation modelling in order to generate more accurate results. For example, fitting parameter C may be provided a different value for the leakage of transistor at negative Vg (aka, gate induced drain leakage (GIDL)) than for regular PN junction leakage (e.g., fitting parameter C may be set at 0.5 for diode leakage modeling, and five for MOSFET BBT modeling). The value of built-in electric field $F_1$ is set to the maximum of the two terms in the above equation because the built-in electric field of a circuit element is not determined solely by the PN-junction containing the selected cell, and therefore the square-root-value portion of the max function cannot be solely utilized to calculate the built-in electric field in all simulation conditions. Accordingly, the zero-bias term $\acute{F}_1$ is generated taking into account workfunction differences of different materials in the 2D/3D structure (e.g. gate metal workfunction and nanowire channel workfunction difference can cause electric field) and may be calculated using known techniques.

According to a specific embodiment of the present invention, the local BBT modeling function is determined using the equation:

$$R_{BBT} = -B \cdot |F|^\sigma \cdot \exp\left(-\frac{F_0}{|F|}\right) \cdot g$$

where $R_{BBT}$ is the BBT current estimate value, the term B is a temperature-independent pre-factor, the term $F_0$ is a temperature-dependent bandgap force, and the exponent σ has a value in the range of two and two-and-one-half. In this embodiment, the terms B, $F_0$ and the exponential factor $$\exp\left(-\frac{F_0}{|F|}\right)$$

represent conventional terms used in conventional (e.g., Hurkx-based) local BBT modeling functions, and are calculated using the same techniques utilized by the conventional local BBT modeling functions. Based on comparisons between estimates generated by the improved local modeling technique and conventional non-local modeling techniques, the inventors determined that the above equation generates BBT current estimates $R_{BBT}$ with substantially higher accuracy (i.e., in comparison to conventional Hurkx-based local modeling techniques) while maintaining the reliable convergence associated with local modeling techniques.

According to alternative practical embodiments of the invention, the improved local modeling function is utilizing in an EDA tool as part of a TCAD toolset, where the improved local modeling function is implemented in a TCAD simulator and utilized by a BBT current estimator during simulation of a TCAD (e.g., nanodevice) model. The TCAD model is first generated by a model generator based on a suitable description of a target physical circuit element (e.g., nanodevice), which may be provided in a layout file portion of a circuit design. A simulator of the TCAD toolset then simulates operation of the nanodevice by way of applying simulated potentials to the nanodevice model. During simulation the BBT current estimator utilizes the improved local BBT modeling function to estimate BBT currents generated at a selected location/element in accordance with the details provided above and explained in additional detail below.

This Summary does not attempt to completely signify any particular innovation, embodiment, or example as it can be used in commerce. Additionally, this Summary is not intended to signify essential elements of an innovation, embodiment or example or to limit the scope of the subject matter of this disclosure.

The innovations, embodiments, and/or examples found within this disclosure are not all-inclusive, but rather describe the basic significance of the subject matter. Accordingly, one use of this Summary is as a prelude to a Detailed Description presented later.

BRIEF DESCRIPTION OF THE DRAWINGS

The following Detailed Description, Figures, appended Additional Figures and appended Claims signify the nature and advantages of the innovations, embodiments and/or examples of the claimed inventions. All of the Figures signify innovations, embodiments, and/or examples of the claimed inventions for purposes of illustration only and do not limit the scope of the claimed inventions. Such Figures are not necessarily drawn to scale, and are part of the Disclosure.

In the Figures, similar components or features may have the same, or similar, reference signs in the form of labels (such as alphanumeric symbols, e.g., reference numerals), and may signify similar or equivalent functionality. Further, various components of the same type may be distinguished by following the reference label by a dash and a second label that distinguishes among the similar components. If only the first reference label is used in the specification, the description is applicable to any one of the similar components having the same first reference label irrespective of the second reference label. A brief description of the Figures is below.

In such various figures, reference signs may be omitted as is consistent with accepted engineering practice; however, one of ordinary skill in the art will understand that the illustrated components are readily understood when viewed in context of the illustration as a whole and the accompanying disclosure describing such various figures.

DETAILED DESCRIPTION OF THE DRAWINGS

The Figures and the following Detailed Description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to enable one or more of the exemplary innovations, embodiments and/or examples. In the interest of not obscuring the presentation of the exemplary innovations, embodiments and/or examples in the following Detailed Description, some processing steps or operations that are known in the art may be combined together for presentation and for illustration purposes and might not be described in detail. However, a person skilled in the art will recognize that these exemplary innovations, embodiments and/or examples may be used in commerce without these specific details or with equivalents thereof. In other instances, well-known processes and devices are not described in detail as not to unnecessarily obscure aspects of these exemplary innovations, embodiments and/or examples. In other instances, some processing steps or operations that are known in the art may not be described at all. Instead, the following description is focused on the distinctive features or elements of various exemplary innovations, embodiments and/or examples. Furthermore, while this description may refer to some components of the structure in the singular tense, more than one component may be depicted throughout the Figures and like components are labeled with like numerals.

Figure 1:
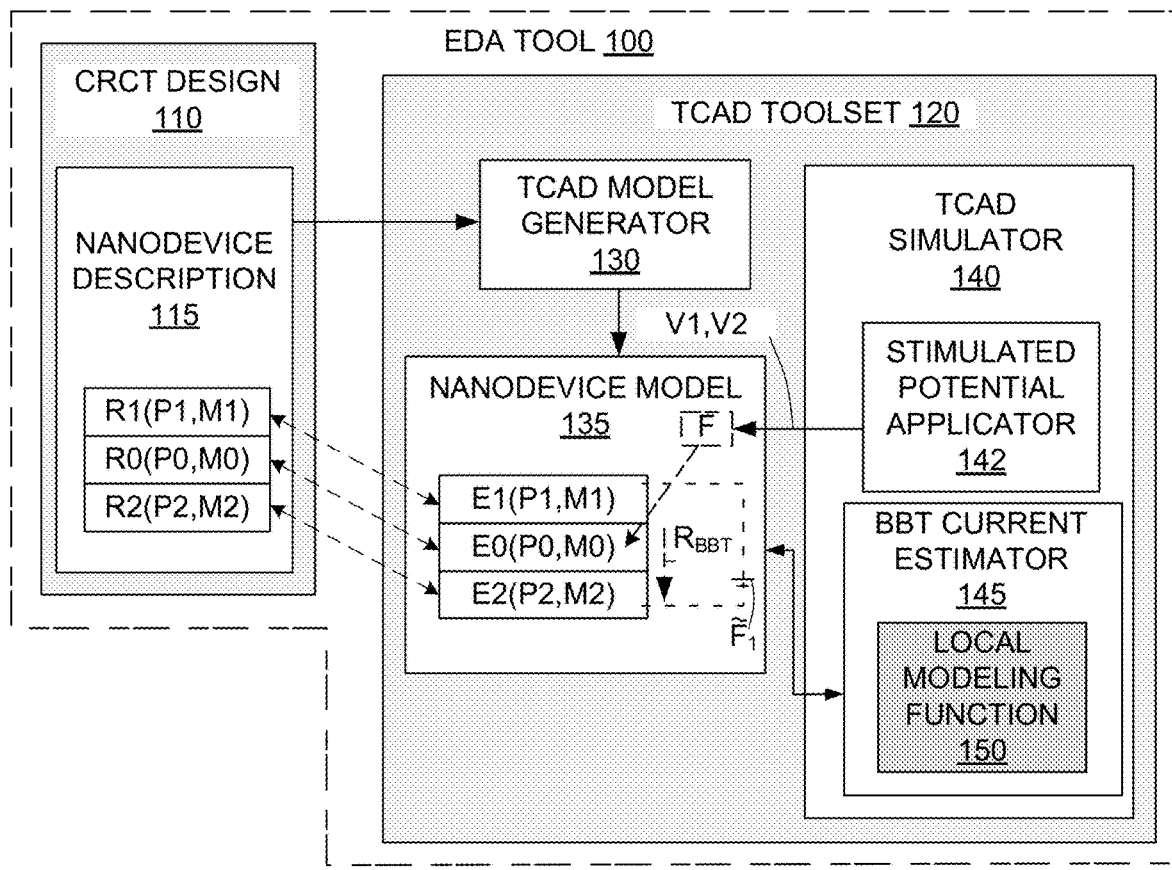
FIG. 1 is a block diagram depicting a partial EDA tool including a simplified TCAD toolset that utilizes the improved local modeling function configured in accordance with an embodiment of the present invention.

FIG. 1 is a block diagram generally depicting a computer-implemented EDA tool 100 including a circuit design 110 and a TCAD toolset 120.

Circuit design 110 includes a generalized nanodevice description 115, which serves as an exemplary circuit device in the description below. The term "nanodevice" is used as an example of a low-voltage circuit type to which the present invention is particularly directed and is not intended to be limiting. Note that circuit design 110 may comprise only a single nanodevice description (e.g., which may occur when a device/process/integration engineer is attempting to efficiently analyze a new low-voltage circuit element concept), or nanodevice description 115 may be one circuit element of multiple circuit elements forming an integrated circuit (e.g., an ASIC or SoC; e.g., which may occur in the case of an development/verification engineer attempting to optimize and/or verify electrical behavior of circuit low-voltage elements utilized in their circuit designs). Nanodevice description 115 is understood to include all details required to generate a physics-based 2D or 3D TCAD model of the type described above.

TCAD toolset 120 is depicted in greatly simplified form and generally includes a TCAD model generator 130 and a TCAD simulator 140. TCAD model generator 130 is configured to generate a 2D or 3D TCAD model (virtual representation) 135 of the circuit element defined by nanodevice description 115 such that TCAD model 135 includes a multiple cells/space-points, which are indicated in simplified form by blocks E0, E1 and E2 in FIG. 1. Note that an actual TCAD model typically includes a large number of cells. As explained in the background section, each cell e.g., E0 includes position data and material data corresponding with an associated portion of nanodevice description 115, where the position data defines the spatial 2D or 3D position of each cell within TCAD model 135 corresponding to a spatial positional its associated portion in nanodevice description 115, and the material data operably defines a material composition and corresponding electrical characteristics of the associated portion. As indicate by the dashed-line-double-arrows in FIG. 1, exemplary cells E0, E1 and E2 of TCAD model 135 include positional data and material data that respectively corresponds to associated portions R0, R1 and R2 of nanodevice description 115. That is, cell E0 includes position data P1 and material data M1 that describes with the material (e.g., silicon oxide) located at the X-Y-Z coordinate position of associated portion R0 of nanodevice description 115, cell E1 includes position data P1 and material data M1 that describes with the material (e.g., p-doped silicon) located at the X-Y-Z coordinate position P1 of associated portion R1, and cell E2 includes position data P2 and material data M2 that describes with the material (e.g., n-doped silicon) located at the X-Y-Z coordinate position P1 of associated portion R2. In one embodiment, TCAD model generator 130 is configured and operates substantially as used in conventional TCAD toolsets.

TCAD simulator 130 is configured to simulate the operation of nanodevice 115, for example, by way of applying simulated potentials V1 and V2 to corresponding virtual structures (e.g., a virtual gate structure and a virtual drain structure, respectively) of TCAD model 135 using known techniques such that a desired simulated external electric field F is generated on a selected cell. In the following description cell E0 is utilized as the exemplary selected cell, and cells E1 and E2 are referenced as exemplary cells located adjacent to selected cell E0. The application of potentials V1 and V2 is depicted by of a simulated potential applicator 142 and the generation of external electric field F at selected cell E0 is indicated by a dashed-line-arrow to illustrate the related concepts in a greatly simplified manner for brevity, and it is understood that these functions are performed by way of known TCAD toolset operations.

During TCAD simulation, a BBT current estimator 145 utilizes an improved local BBT modeling function 150 to generate a BBT current estimate $R_{BBT}$ corresponding to an estimated BBT current that would be generated in an actual nanodevice in response to an external electric field corresponding to simulated electrical field F. As explained in additional detail below, improved local BBT modeling function 150 is characterized by including an exponential factor g having a value determined by calculating a difference between external electric field F and a built-in electric field F1 that is generated at selected cell E0 as described below with reference to FIGS. 3A, 3B and 4, with the difference being raised to an exponential power x that is greater than one. As explained in further detail below, improved local BBT modeling function 150 implements exponential factor g such that BBT current estimate $R_{BBT}$ becomes zero when a level of external electric field F is equal to (or less than) a level of the built-in electric field F1.

Figure 2:
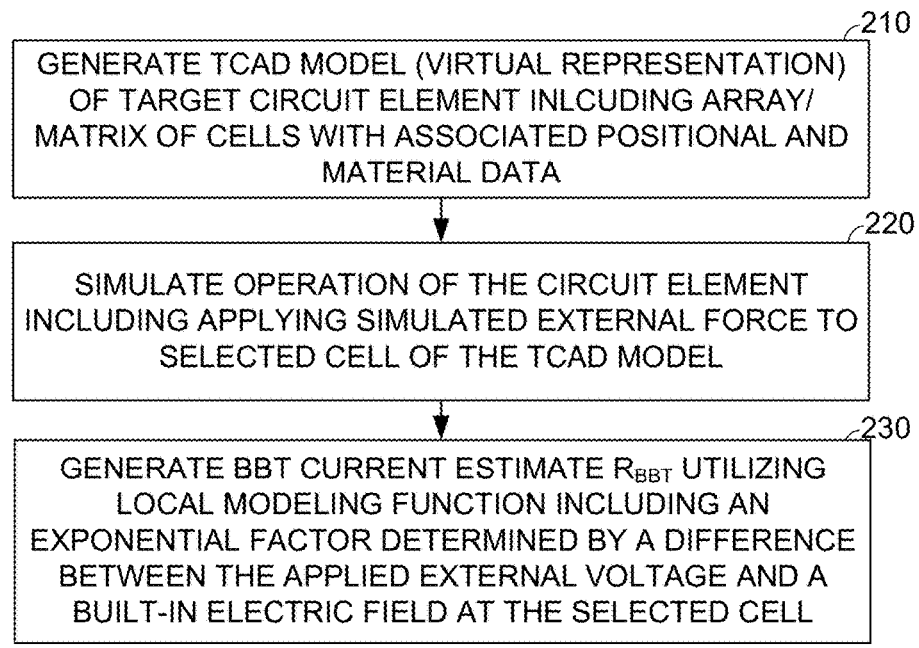
FIG. 2 is a flow diagram depicting a generalized method for estimating band-to-band tunneling (BBT) currents using the improved local modeling function implemented in the TCAD toolset of FIG. 1 according to another embodiment of the present invention.

FIG. 2 is a flow diagram depicting a generalized method for generating BBT current $R_{BBT}$ in a low-voltage circuit element (e.g., nanodevice 115), for example, using TCAD toolset 120 of FIG. 1. Referring to block 210, the generalized method begins with generating a 2D or 3D TCAD model (virtual representation) of a circuit element such that each cell (space-point) of the TCAD model includes positional and material data of an associated region of the circuit element. An example of this model generation process is described above with reference to the generation of TCAD model 135 based on nanodevice description 115. Referring to block 220, simulated operation of the circuit device is then performed such that a simulated external electric field is applied to a selected cell of the TCAD model (e.g., as described above with reference to the generation of external electrical field F on selected cell E0). As indicated in block 230, improved local BBT modeling function 150, which is described briefly above and in greater detail below, is then utilized to generate a BBT current estimate $R_{BBT}$ using exponential factor g having a value determined by subtracting a built-in electric field F1 at said selected cell E0 from the external electric field F, and then raising the resulting difference to an exponential power x greater than one.

The improved local BBT modeling function of the present invention will now be described in additional detail with reference to a specific exemplary embodiment. Note that the exemplary embodiment set forth below is intended for descriptive purposes, and the specific terms and values provided in the following description are not intended to be limiting unless specified in the appended claims.

According to an exemplary embodiment, local BBT modeling function 150 is determined using Equation 3:

$$R_{BBT} = -B \cdot |F|^\sigma \cdot \exp\left(-\frac{F_0}{|F|}\right) \cdot g \quad \text{(Equation 3)}$$

where $R_{BBT}$ is the BBT current estimate value, B is a temperature-independent pre-factor, $F_0$ is a temperature-dependent bandgap force, and exponent σ has a value in the range of two and two-and-one-half. Note that the terms B, $F_0$ and the exponential factor $$\exp\left(-\frac{F_0}{|F|}\right)$$

represent conventional terms used in conventional (e.g., Hurkx-based) local BBT modeling functions, and are calculated in the context of Equation 2 using the same techniques utilized in the implementation of conventional local BBT modeling functions. For example, in one embodiment temperature-independent pre-factor B is given the value of $4 \times 10^{14}$ cm$^{-1/2} \cdot$v$^{-5/2}$ and temperature-dependent bandgap force $F_0$ is proportional to $E_g^{3/2}$, where $E_g$ is the bandgap at the selected element, both values being implemented in a manner similar to that used in the conventional Hurkx-based local BBT modeling function described above.

In accordance with the exemplary embodiment, the novel exponential factor g of Equation 3 is generated in accordance with Equation 4, below:

$$g = \left(\frac{F - F_1}{F_1}\right)^{1.5} \quad \text{(Equation 4)}$$

where F is the external electric field applied to the selected cell and $F_1$ is the built-in electrical force at the selected cell determined by the maximum function indicated in Equation 5 (below):

$$F_1 = \max\left(\tilde{F}_1, \sqrt{C\frac{2qE_gN_{net}}{\varepsilon}}\right) \quad \text{(Equation 5)}$$

where $\tilde{F}_1$ is a built-in electric field occurring at the selected cell at zero bias, C is a fitting parameter determined by at least one of a structural configuration and an element type of the modeled circuit element, $E_g$ is a bandgap value of the selected element, $N_{net}$ is a doping concentration of the corresponding material located at the selected cell, and E is the dielectric constant of the corresponding material located at the selected cell. Fitting parameter C is a novel term that was conceived when the inventors realized that 3D geometries have complicated electrostatic solutions, and found that that fitting parameter C may be utilized to adjust for different types of simulation modelling in order to generate more accurate results. For example, fitting parameter C may be provided a different value for the leakage of transistor at negative Vg (aka, gate induced drain leakage (GIDL)) than for regular PN junction leakage (e.g., fitting parameter C may be set at 0.5 for diode leakage modeling, and five for MOSFET BBT modeling). The value of built-in electric field $F_1$ is set to the maximum of the two terms in the above equation because the built-in electric field of a circuit element is not determined solely by the PN-junction containing the selected cell, and therefore the square-root-value portion of the max function (i.e., $$\sqrt{C\frac{2qE_gN_{net}}{\varepsilon}}$$

cannot be solely utilized to calculate the built-in electric field in all simulation conditions. Accordingly, the zero-bias term $\tilde{F}_1$ is generated taking into account workfunction differences of different materials in the 2D/3D structure (e.g. gate metal workfunction and nanowire channel workfunction difference can cause electric field). In one embodiment, the zero-bias term $\tilde{F}_1$ is calculated using techniques known in the art.

Figure 3:
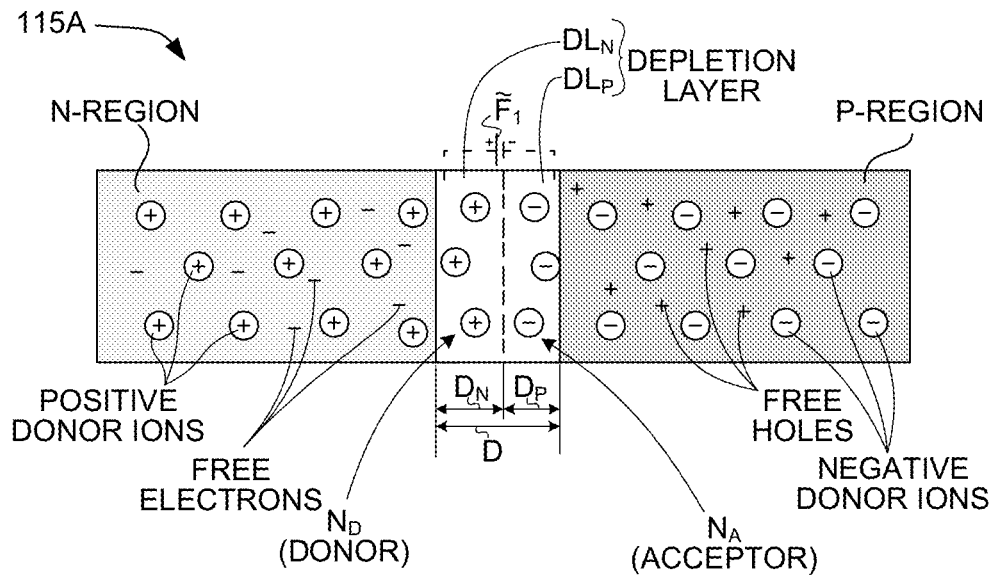
FIG. 3 is a cross-sectional view showing a PN junction of a simplified circuit device.
Figure 4:
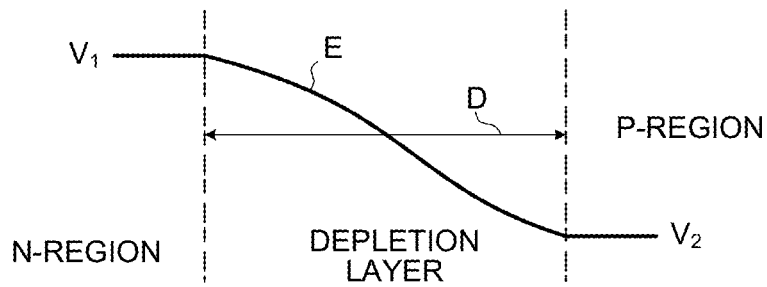
FIG. 4 is graph depicting an exemplary E-field generated in a depletion region of the circuit device of FIG. 3.
Figure 5:
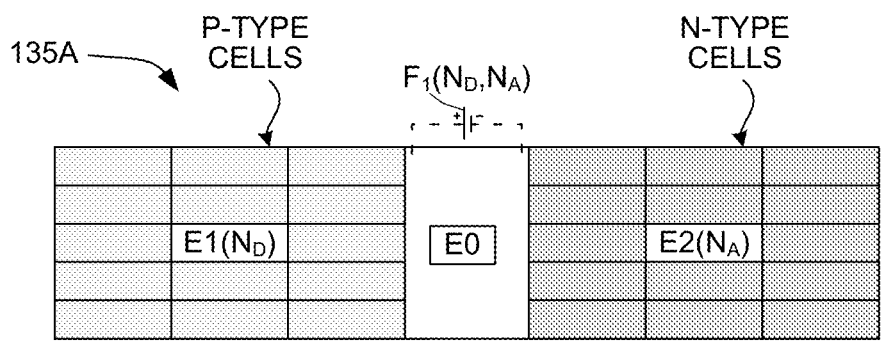
FIG. 5 is a simplified diagram showing a TCAD model of the low-voltage circuit device of FIG. 3, and illustrates how a built-in electrical field is calculated at a selected cell according to an exemplary embodiment of the present invention.

FIGS. 3-5 illustrate a process for determining total external force F and built-in electrical force $F_1$ for purposes of calculating a BBT current during TCAD simulation according to another exemplary embodiment of the present invention. FIG. 3 is a cross-sectional view showing a PN junction of a simplified (physical) low-voltage circuit device 115A, and FIG. 4 is graph depicting an exemplary E-field generated in a depletion region of low-voltage circuit device 115A. FIG. 5 is a simplified diagram showing a TCAD model 135A generated as described above to replicate physical circuit device 115A and illustrates how total external force F and built-in electrical force $F_1$ are determined during TCAD simulation in accordance with the exemplary embodiment.

The formation of a P-N junction during semiconductor fabrication produces a naturally-occurring barrier force and a built-in electrical force $F_1$ across a depletion layer that forms between the abutting N-type and P-type doped regions. Referring to FIG. 3, the depicted P-N junction of circuit device 115A is formed at an interface between a P-doped semiconductor region (P-REGION) and an N-doped semiconductor region (N-REGION), which are formed by diffusing P-type dopant atoms (e.g., boron or gallium) and N-type dopant atoms (e.g., phosphorus or arsenic) into adjacent regions of a semiconductor (e.g., silicon) structure using known techniques. When each P-N junction is newly formed, a very large density gradient is initially generated between the N-type and P-type dopants that causes free electrons from positive donor ions of the N-region to migrate across the interface to fill holes in negative donor ions of the P-region, and causes free holes from the negative donor ions to migrate into the N-region. Referring to FIG. 4, as this migration proceeds a potential $V_1$ on the donor side becomes positive in relation to a potential $V_2$ on the acceptor side, which generates an E-field in the depletion layer whose strength varies as indicated. The charge carrier migration process terminates when a large enough number of free electrons and holes have migrated across the interface to produce a barrier voltage (i.e., represented by the total drop $V_1-V_2$ of the E-field curve in FIG. 4) that is strong enough to prevent (i.e., in the absence of a sufficiently strong external electric field) any more charge carriers from crossing the P-N junction interface. When this occurs the depletion layer is completely depleted of free charge carriers is formed between the N-region and the P-region (i.e., although portions of the N-type region in and P-type region located on opposite sides of the depletion layer respectively contain free electrons and free holes, the depletion layer is completely depleted of free charge carriers). The built-in electrical force $F_1$ is related to this barrier force, and is generated because the N-region loses electrons and the P-region loses holes during formation of the depletion layer, whereby a potential of the N-region becomes positive with respect to a potential of the P-region, and the presence of impurity ions on both sides of the PN junction produce an electric field to be established across this region with the N-side at a positive voltage relative to the P-side.

The size of a given P-N junction's depletion layer and the magnitude of the associated built-in electrical force $F_1$ may be estimated using the doping concentrations of the N-type and P-type regions. Referring to FIG. 3, the depletion layer of circuit device 115A is divided into a P-type portion $DL_P$ containing negatively charged acceptor ions $N_A$ that are concentrated along the P-region side of the P-N junction interface, and an N-type portion $DL_N$ containing positively charged donor ions $N_D$ that are concentrated along the N-region side of the PN junction interface. A width $D_N$ of N-type depletion layer portion $DL_N$ is determined by a doping concentration of N-type dopant atoms in the N-region, a width $D_P$ of P-type depletion layer portion $DL_P$ is determined by the doping concentration of N-type dopant atoms in the P-region, and a total width D of the depletion layer is a sum of widths $D_N$ and $D_P$. A total width and a width portion $D_P$ of depletion layer portion $DL_P$, which are proportional to the doping concentrations of the N-type and P-type regions (i.e., higher doping concentrations generate wider width portions $D_N$ and $D_P$). A magnitude of built-in electrical force $F_1$ varies across the width of the depletion layer in a manner similar to that of the E-field shown in FIG. 4.

FIG. 5 depicts in a greatly simplified form how built-in electrical force $F_1$ may be calculated at selected cell E0 using material (e.g., doping) parameter information and associated spatial information of cells located in the adjacent P-doped and N-doped regions. That is, in general the spatial location and doping concentration information $N_D$ and $N_A$ assigned to the adjacent cells (e.g., cells E1 and E2), along with the positional data associated with selected cell E0, are utilized in accordance with the principles described above to calculate the built-in electric force $F_1$ generated at selected cell E0. In a practical embodiment, calculation of built-in electrical force $F_1$ for a selected TCAD model cell using a TCAD toolset configured to implement the present invention involves solving Poisson's equation to find the potential distribution and field (field is the gradient of potential).

Note that the present invention precludes the need for term $D(F,E,E_n,E_{fp})$, which is utilized to adjust conventional Hurkx-based modeling functions between low-voltage and high-voltage operations. In a presently preferred embodiment, the D term utilized in the Hurkx equations is effectively implemented as a constant value equal to −1 (negative one) in the improved BBT modeling function described herein. By addressing the D function in this manner, the inventors achieved best-fit results between the improved BBT modeling function and a corresponding non-local BBT modeling function. That is, the inventors realized that, in order for the improved BBT modeling function to work well, it needs to model pure generation (i.e. with R<0; note that R>0 produces recombination).

Figure 6:
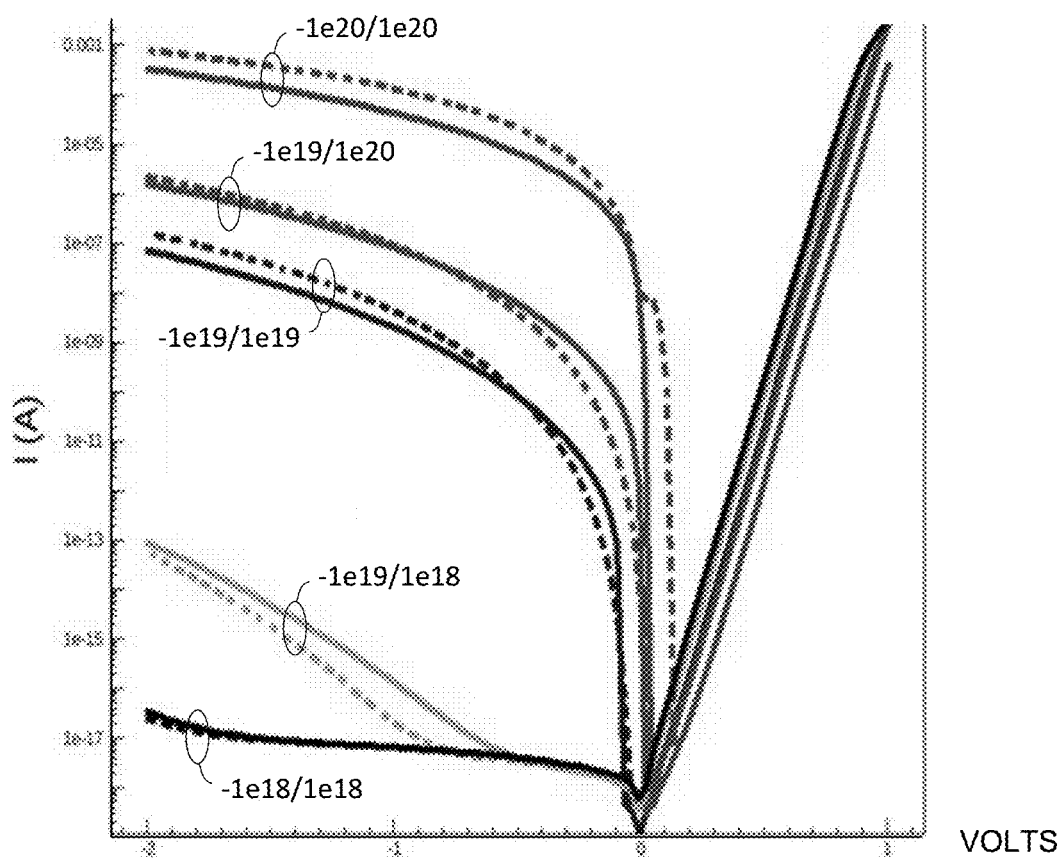
FIG. 6 is a graph comparing BBT current estimates generated by the improved simulation modeling technique of the present disclosure with BBT current estimates generated by a corresponding non-local modeling technique for various 1D pin diode models.
Figure 7:
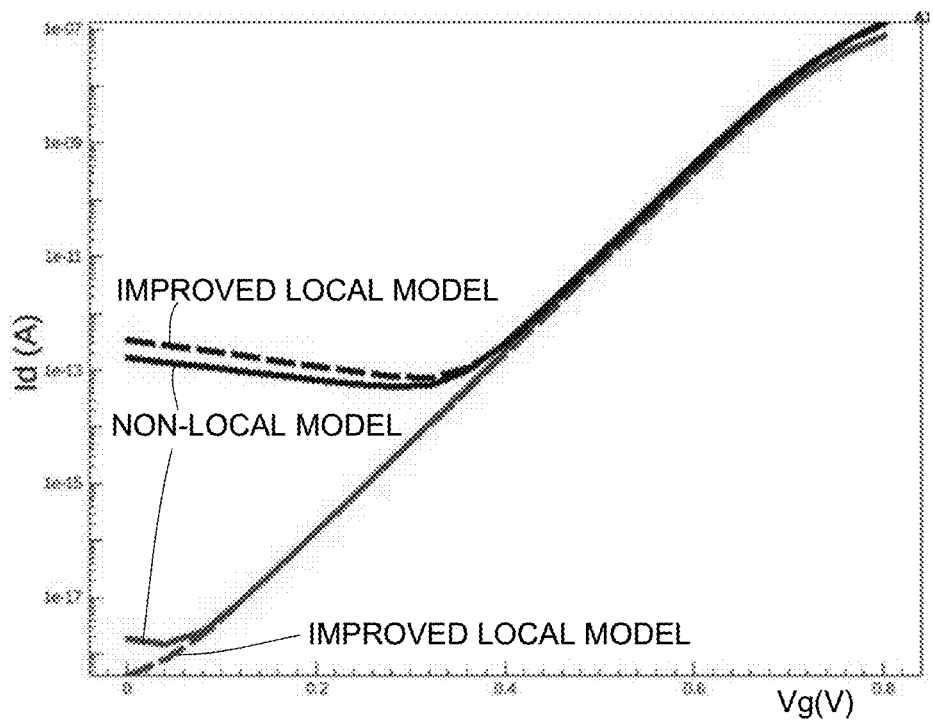
FIG. 7 is a graph showing exemplary BBT current estimates generated for a 2D MOSFET model using conventional techniques and the improved simulation modeling technique of the present disclosure.
Figure 8:
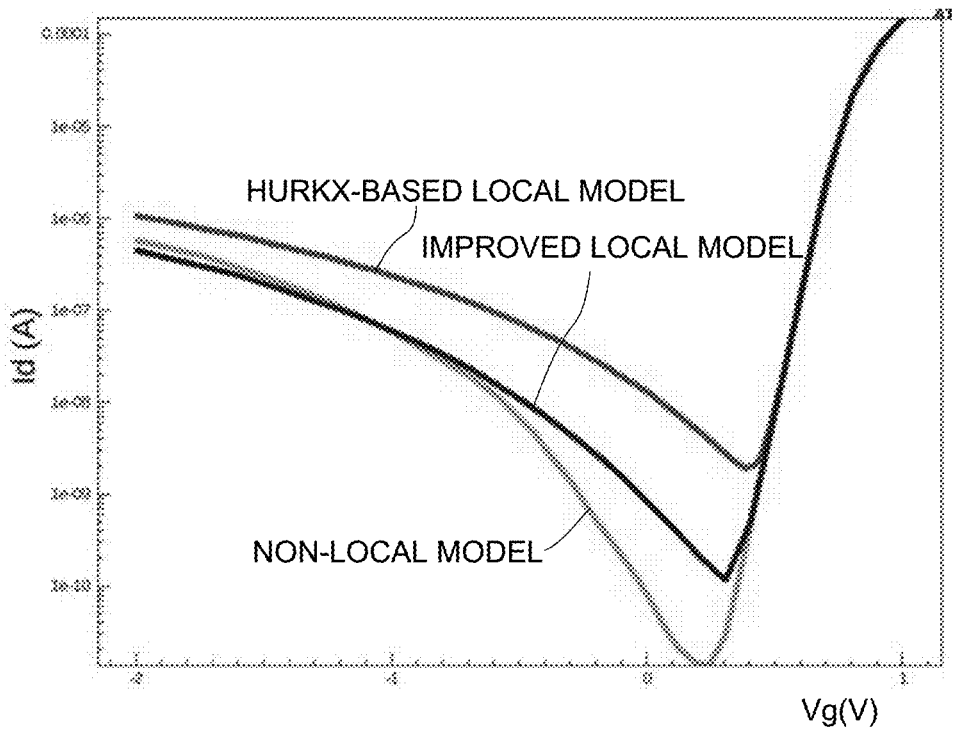
FIG. 8 is a graph showing exemplary BBT current estimates generated for a 3D FinFET model using conventional techniques and the improved simulation modeling technique of the present disclosure.

FIGS. 6-8 include various graphs that illustrate how the present invention facilitates the generation more accurate BBT current estimates (i.e., in comparison to conventional Hurkx-based local models) during 1D, 2D and 3D TCAD simulation of circuit elements at low operating voltages while exhibiting total processing times and convergence reliability that are comparable with conventional local BBT modeling functions. FIG. 6 compares BBT current estimates generated for a 1D pin diode model for various n-type and p-type doping concentrations, with the ranges of BBT current estimates generated using the improved local BBT model depicted by the dashed-line curves, and the corresponding ranges of BBT current estimates generated using a conventional non-local BBT model depicted by the solid-line curves. As indicated by this figure, the improved local BBT model provides results that are very close in accuracy to those generated by the non-local BBT model over the entire reverse-biased external field range, but the improved local BBT model generates its BBT current estimates in substantially less time and with much higher convergence reliability than the non-local BBT model. Similarly, FIG. 7 shows the local modeling function of the present invention generated BBT current estimates (indicated by dashed-lines) that are very close to those generated by corresponding non-local modeling techniques (indicated by solid-lines) when utilized during 3D TCAD simulation of FinFET models. As shown in FIG. 8, when applied to a 2D TCAD simulation of a MOSFET Gate-induced drain leakage (GIDL), the local modeling function of the present invention generates BBT current estimates that more closely match results generated by a corresponding non-local modeling techniques than those generated by a conventional Hurkx-based local modeling technique. However, the convergence the local modeling function of the present invention is much better than that of the corresponding non-local modeling techniques, and simulation speed (i.e., processing time required to achieve convergence) of the local modeling function of the present invention is similar to that of the conventional Hurkx-based local modeling technique (i.e., much less than the corresponding non-local modeling technique).

Technology Specific EDA System/Workflow Explanation

Figure 9:
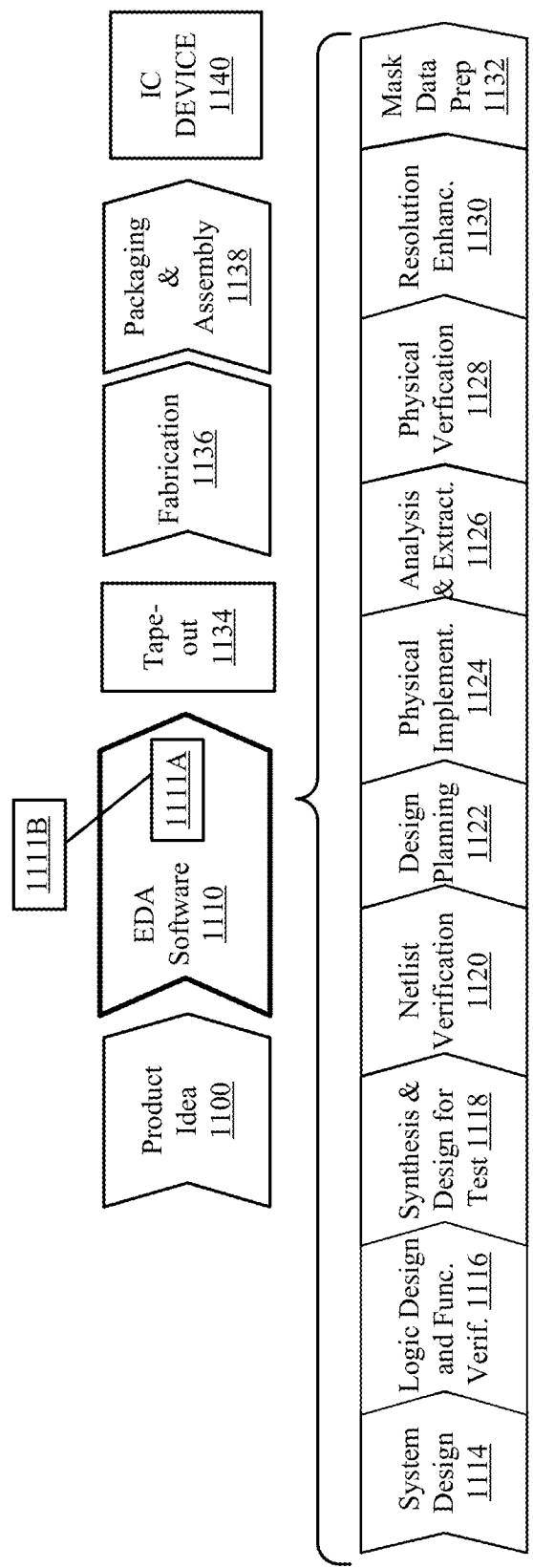
FIG. 9 is a flowchart illustrating various operations in the design and fabrication of an integrated circuit in accordance with an embodiment of the present disclosure.

FIG. 9 illustrates various processes performed in the design and fabrication of IC devices using EDA software tools with a computer to transform data and instructions that represent the associated IC devices. These processes start with the generation of a product idea (1100) with information supplied by one or more circuit designers. The product idea is realized as the evolving circuit design during the circuit design process performed by the circuit designer(s) using EDA software tools (1110). One or more steps of the EDA software design process performed by EDA software tools (1110) is implemented using a computer-readable medium 1111A that is read by a computer 1111B. EDA software tools may also be signified herein using the singular "EDA software tool" or "EDA tool", as EDA software, or as a design tool. When a circuit design is finalized, it is typically taped-out (1134), and then multiple ICs, each being a physical implementation of the final circuit design, are fabricated on a semiconductor wafer (1136) using a selected technology node. The semiconductor wafer is then diced into individual chips, with each chip including one of the ICs, and then the chips are packaged and assembled using corresponding processes (1138), resulting in finished IC device 1140.

Note that the design process that uses EDA software tools (1110) includes operations 1114-1132, which are described below. This design flow description is for illustration purposes only (i.e., to establish the context in which the present invention is typically implemented) and is not meant to limit the present disclosure. For example, an actual circuit design may require a circuit designer to perform the design operations in a different sequence than the sequence described herein.

During system design (1114), a circuit designer describes the functionality to be performed by the manufactured IC device. The designer can also perform what-if planning to refine the functionality and to check costs. Note that hardware-software architecture partitioning can occur at this stage. Exemplary EDA software products from Synopsys, Inc. of Mountain View, Calif. that can be used at this stage include: Model Architect, Saber, System Studio, and Designware products. Cells or other descriptions including all relevant information pertaining to specific circuit types are typically copied from a library accessible by way of the EDA software tool, and inserted into a circuit design during the system design process.

Then, during logic design and functional verification (1116), VHDL or Verilog code for modules in the circuit is written and the design is checked for functional accuracy. More specifically, the design is checked to ensure that it produces the correct outputs. The VHDL or Verilog code is software comprising optimized readable program instructions adapted for the efficient description of a logic design. Exemplary EDA software products from Synopsys, Inc. of Mountain View, Calif. that can be used at this stage include: VCS, Vera, Designware, Magellan, Formality, ESP and Leda products.

Next, during synthesis and design for test (1118), VHDL/Verilog code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products.

During netlist verification (1120), the netlist is checked for compliance with timing constraints and for correspondence with the VHDL/Verilog code. Exemplary EDA software products from Synopsys, Inc. of Mountain View, Calif. that can be used at this stage include: Formality, Primetime, and VCS products.

Furthermore, during design planning (1122), an overall floor plan for the integrated circuit is constructed and analyzed for timing and top-level routing. Exemplary EDA software products from Synopsys, Inc. of Mountain View, Calif. that can be used at this stage include: Astro and IC Compiler products.

During physical implementation (1124), the placement (positioning of circuit elements such as transistors or capacitors) and routing (connection of the same by a plurality of conductors) occurs. Exemplary EDA software products from Synopsys, Inc. of Mountain View, Calif. that can be used at this stage include: the Astro and IC Compiler products.

Then, during analysis and extraction (1126), the circuit function is verified at a transistor level, which permits refinement of the logic design. Exemplary EDA software products from Synopsys, Inc. of Mountain View, Calif. that can be used at this stage include: Astrorail, Primerail, Primetime, and Star RC/XT products.

Next, during physical verification (1128), the design is checked to ensure correctness for manufacturing issues, electrical issues, lithographic issues, and circuitry. Exemplary EDA software products from Synopsys, Inc. of Mountain View, Calif. that can be used at this stage include the Hercules product.

Moreover, during resolution enhancement (1130), geometric manipulations of the layout are performed to improve manufacturability of the design. Exemplary EDA software products from Synopsys, Inc. of Mountain View, Calif. that can be used at this stage include: Proteus, Proteus, and PSMGED products.

Additionally, during mask-data preparation (1132), the 'tape-out' data for production of masks to produce finished integrated circuits is provided. Exemplary EDA software products from Synopsys, Inc. of Mountain View, Calif. that can be used at this stage include the Cats. family of products.

For all of the above-mentioned integrated circuit design tools, similar tools from other EDA vendors, such as Cadence and Mentor Graphics can be used as an alternative. Additionally, similarly non-commercial tools available from universities can be used.

Embodiments of the present disclosure can be used during one or more of the above-described stages. Specifically, some embodiments of the present disclosure can be used in EDA software 1110.

A storage subsystem is preferably used to store the basic programming and data constructs that provide the functionality of some or all of the EDA tools described herein, and tools applied for development of cells for the library and for physical and logical design using the library. These software modules are generally executed by one or more processors in a manner known to those of ordinary skill in the art.

Technology Specific General Computer Explanation

Figure 10B:
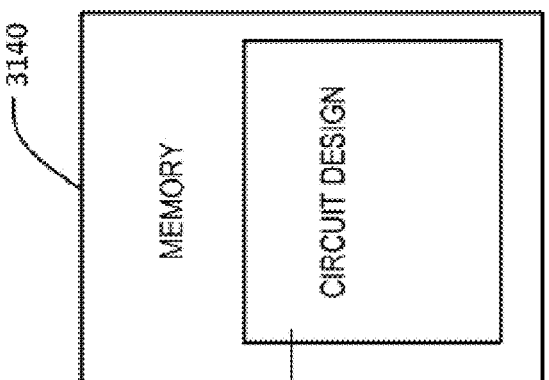
FIGS. 10A, 10B and 10C are simplified block diagrams of a computer system suitable for use with embodiments of the technology, as well as circuit design and circuit embodiments of the technology.
Figure 10C:
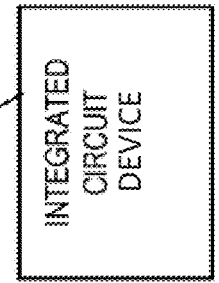
Figure 10A:
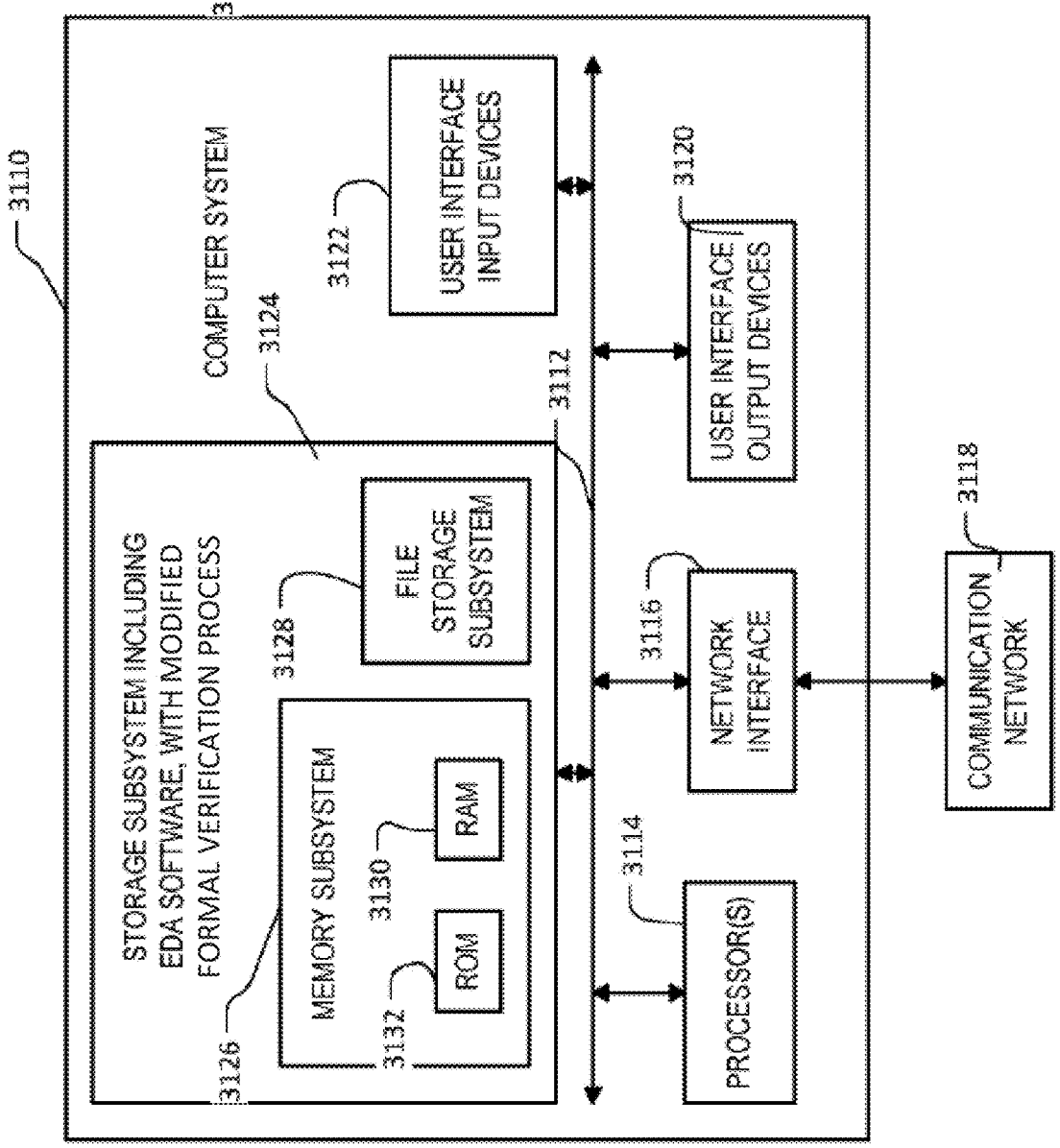
Figures 11A, 11B:
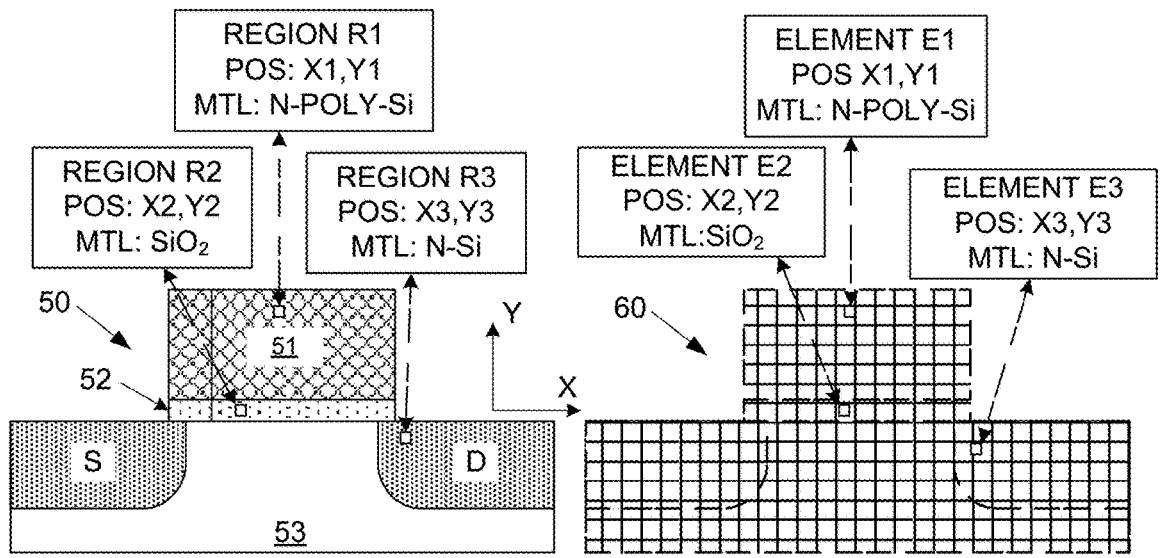
FIGS. 11A and 11B are simplified perspective views showing an NMOS cell and a corresponding 2D model (virtual representation), respectively.
Figures 12A, 12B:
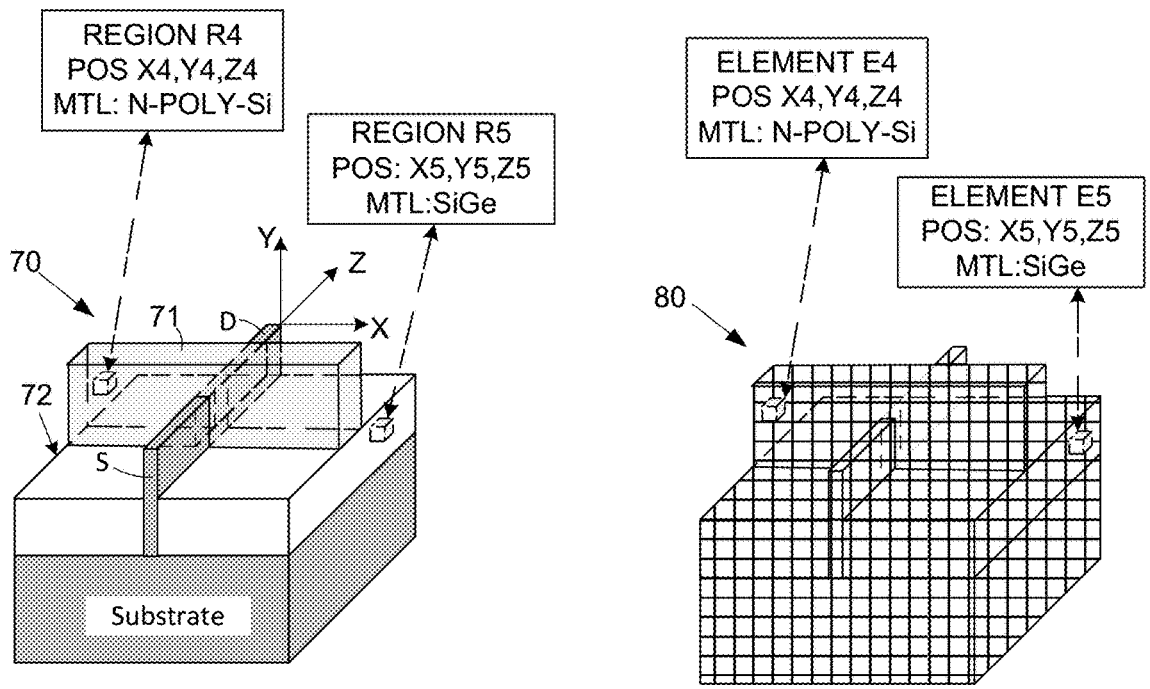
FIGS. 12A and 12B are simplified perspective views showing a single-fin FinFET cell and a corresponding 3D model (virtual representation), respectively.
Figure 13A:
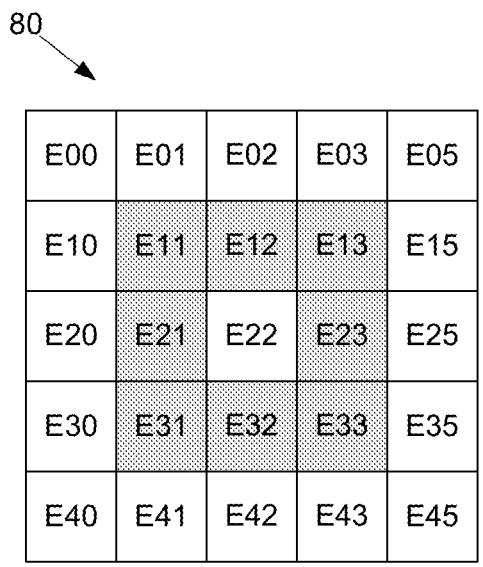
FIG. 13A shows a group of element of a 2D model with a central element surrounded by a set of local elements and further surrounded by additional non-local elements disposed around the set of local elements.
Figure 13B:
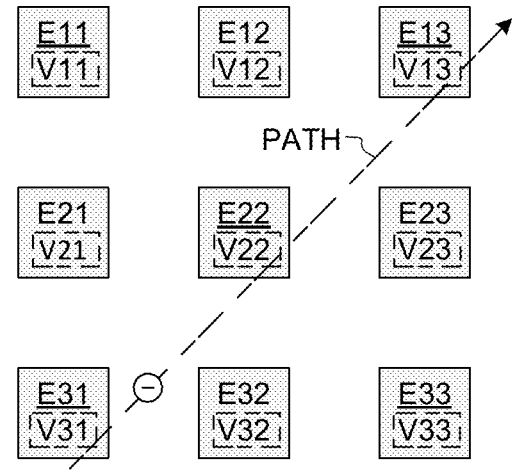
FIG. 13B shows the central element and set of local elements of FIG. 13A in an exploded view.
Figure 14A:
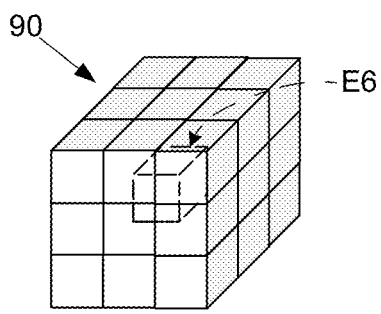
FIGS. 14A and 14B are perspective views showing a set of local elements surrounding a central element of a 3D model (virtual representation) in integral and exploded views, respectively.
Figure 14B:
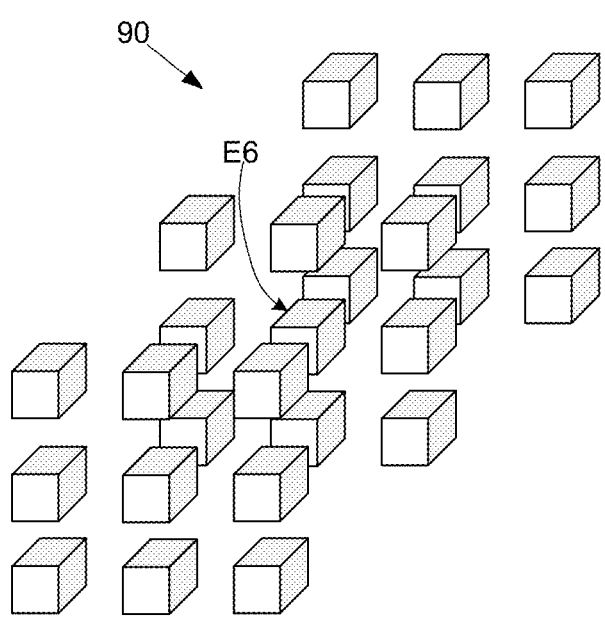
Figure 15:
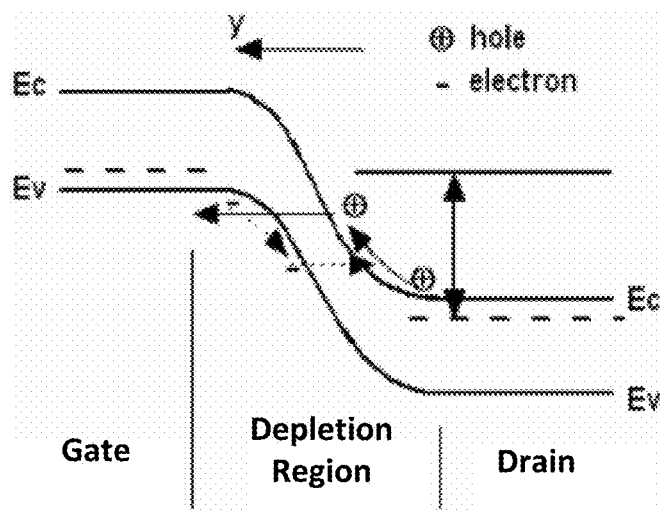
FIG. 15 is a graph depicting band-to-band tunneling.
Figure 16:
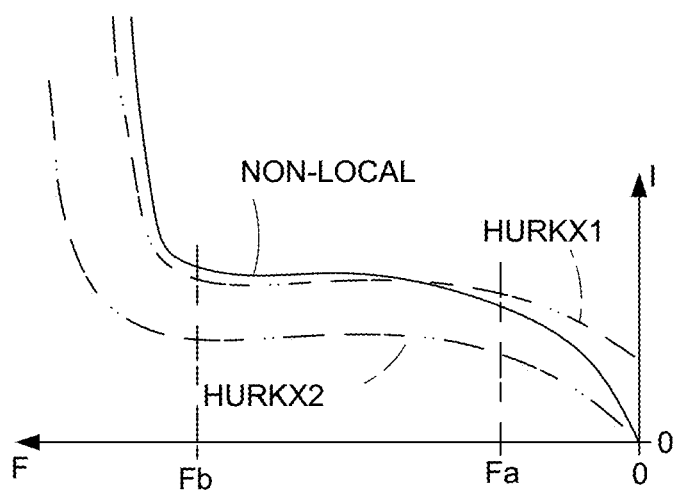
FIG. 16 is a graph showing exemplary BBT estimates generated by conventional local and non-local modeling techniques.

FIGS. 10A, 10B and 10C are simplified block diagrams of a computer system suitable for implementing an EDA tool that implements the methodology of the present invention described above. Computer system 3110 typically includes at least one computer or processor 3114 which communicates with a number of peripheral devices via bus subsystem 3112. These peripheral devices may include a storage subsystem 3124, comprising a memory subsystem 3126 and a file storage subsystem 3128, user interface input devices 3122, user interface output devices 3120, and a network interface subsystem 3116. The input and output devices allow user interaction with computer system 3110.

The computer system may be a server computer, a client computer, a workstation, a mainframe, a personal computer (PC), a tablet PC, a set-top box (STB), a personal digital assistant (PDA), a cellular telephone, a smartphone, a web appliance, a television, a network router, switch or bridge, or any data processing machine capable of executing instructions 124 (sequential or otherwise) that specify actions to be taken by that machine. Innovations, embodiments and/or examples of the claimed inventions are neither limited to conventional computer applications nor the programmable apparatus that run them. To illustrate, the innovations, embodiments and/or examples of the claimed inventions can include an optical computer, quantum computer, analog computer, or the like. Aspects of the present invention are well suited to multi-processor or multi-core systems and may use or be implemented in distributed or remote systems. Processor here is used in the broadest sense to include singular processors and multi-core or multi-processor arrays, including graphic processing units, digital signal processors, digital processors and combinations of these elements. Further, while only a single computer system or a single machine may be illustrated, the use of a singular form of such terms shall also signify any collection of computer systems or machines that individually or jointly execute instructions 124 to perform any one or more of the sets of instructions discussed herein. Due to the ever-changing nature of computers and networks, the description of computer system 3110 depicted in FIG. 10A is intended only as a specific example for purposes of illustrating the preferred embodiments. Many other configurations of computer system 3110 are possible having more or less components than the computer system depicted in FIG. 10A.

Network interface subsystem 3116 provides an interface to outside networks, including an interface to communication network 3118, and is coupled via communication network 3118 to corresponding interface devices in other computer systems or machines. Communication network 3118 may comprise many interconnected computer systems, machines and communication links. These communication links may be wireline links, optical links, wireless links, or any other devices for communication of information. Communication network 3118 can be any suitable computer network, for example the Internet.

User interface input devices 3122 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 3110 or onto communication network 3118. User interface output devices 3120 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide nonvisual display such as via audio output devices. In general, use of the term "output device" is intended to include all possible types of devices and ways to output information from computer system 3110 to the user or to another machine or computer system.

Memory subsystem 3126 typically includes a number of memories including a main random-access memory (RAM) 3130 for storage of instructions and data during program execution and a read only memory (ROM) 3132 in which fixed instructions are stored. File storage subsystem 3128 provides persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem 3128. Bus subsystem 3112 provides a device for letting the various components and subsystems of computer system 3110 communicate with each other as intended. Although bus subsystem 3112 is shown schematically as a single bus, alternative embodiments of the bus subsystem may use multiple busses.

When configured to execute an EDA software tool including a TCAD tool of the type described above, computer system 3110 depicted in FIG. 10A represents an electronic structure suitable for estimating BBT currents in user-specified low-voltage circuit elements of a target circuit design as described above. In addition, the EDA tool includes software tools suitable for modifying the targeted circuit design to replace one or more low-voltage circuit elements with a more suitable low-voltage circuit element when associated BBT current estimates indicate that a given selected low-voltage circuit element may be non-optimal for a target circuit design. A final circuit design is then transmitted to a fabrication facility for production of a physical ASIC or SoC IC device (chip).

FIG. 10B shows a memory 3140 such as a non-transitory, computer readable data storage medium associated with file storage subsystem 3128, and/or with network interface subsystem 3116, and includes a data structure 3180 specifying a circuit design describing an integrated circuit (e.g., a SoC device or an ASIC). The memory 3140 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 10C is a block representing an integrated circuit 3190 (e.g., an SoC device or an ASIC) designed and fabricated in accordance with the processes described above, where circuit 3190 is fabricated in accordance with the circuit design of data structure 3180 (see FIG. 10B).

The foregoing Detailed Description signifies in isolation individual features, structures or characteristics described herein and any combination of two or more such features, structures or characteristics, to the extent that such features, structures or characteristics or combinations thereof are based on the present specification as a whole, in light of the knowledge of a person skilled in the art, irrespective of whether such features, structures or characteristics, or combinations thereof, solve any problems disclosed herein, and without limitation to the scope of the claims. When an embodiment of a claimed invention comprises a particular feature, structure, or characteristic, it is within the knowledge of a person skilled in the art to use such feature, structure, or characteristic in connection with other embodiments whether or not explicitly described.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein were chosen and described to signify the principles of the invention and its useful application, thereby enabling others skilled in the art to understand how various embodiments and variations are suited to the particular uses signified. For example, although the invention is described with specific reference to nanodevices and other low-voltage circuit elements produced using leading edge fabrication processes, the methods and features of the present invention may beneficially be utilized to generate BBT current estimates for other circuit structures made by other fabrication processes as well.

The foregoing Detailed Description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

The invention claimed is:

1. A computer implemented method for estimating a band-to-band tunneling (BBT) current in a circuit element, the method comprising:
generating, by a processor, a model of the circuit element including a plurality of cells, wherein each cell includes position data and material data corresponding with an associated portion of said circuit element such that said position data defines a spatial position of said each cell within said model corresponding to a spatial positional of said associated portion, and such that said material data operably defines a material composition and corresponding electrical characteristics of said associated portion of said circuit element;
simulating operation of the circuit element including applying a simulated external electric field to a selected cell of said plurality of cells; and
utilizing a local BBT modeling function to generate a BBT current estimate, the local BBT modeling function including an exponential factor having a value determined by a difference between said external electric field and a built-in electric field at said selected cell and raised to an exponential power greater than one,
wherein the built-in electric field is calculated using said position data and said material data of said plurality of cells,
wherein said local BBT modeling function implements said exponential factor such that the BBT current estimate becomes zero when the external electric field is equal to the built-in electric field.

2. The method of claim 1, wherein said exponential factor of said local BBT modeling function is determined using the equation:

$$g = \left(\frac{F - F_1}{F_1}\right)^x$$

wherein g is said exponential factor,
wherein F is said external electric field applied to said selected cell,
where $F_1$ is said built-in electrical force, and
wherein x is said exponential power having said value greater than one.

3. The method of claim 2, wherein said exponential power has a value in the range of one and three.

4. The method of claim 3, wherein said exponential power has a value equal to one-and-one-half.

5. The method of claim 1,
wherein said exponential factor g has a value determined by said equation when the external electric field F is greater than the built-in electrical force $F_1$, and
wherein said exponential factor g has a value equal to zero when the external electrical force F is less than or equal to the built-in electric field $F_1$.

6. The method of claim 5, wherein said built-in electric field $F_1$ is determined by the maximum function:

$$F_1 = \max\left(\tilde{F}_1, \sqrt{C\frac{2qE_gN_{net}}{\varepsilon}}\right)$$

where $\tilde{F}_1$ is a built-in electric field occurring at said selected cell at zero bias, wherein C is a fitting parameter determined by at least one of a structural configuration and an element type of said circuit element, wherein $E_g$ is a bandgap value of said selected cell, wherein $N_{net}$ is a doping concentration of said selected cell, and wherein $\varepsilon$ is a dielectric constant of said selected cell.

7. The method of claim 2, wherein utilizing said local BBT modeling function comprises generating said BBT current estimate using the equation:

$$R_{BBT} = -B \cdot |F|^\sigma \cdot \exp\left(-\frac{F_0}{|F|}\right) \cdot g$$

wherein $R_{BBT}$ is said BBT current estimate, wherein B is a temperature-independent pre-factor, wherein $F_0$ is a temperature-dependent bandgap force, and wherein the exponent $\sigma$ has a value in the range of two and two-and-one-half.

8. The method of claim 7, wherein the temperature-independent pre-factor B is $4 \times 10^{14}$ $cm^{-1/2} \cdot v^{-5/2}$.

9. The method of claim 7, wherein the temperature-dependent bandgap force $F_0$ is proportional to $E_g^{3/2}$, where $E_g$ is the bandgap at the selected element.

10. In an electronic design automation (EDA) tool implemented in a computer, a Technology Computer-Aided Design (TCAD) toolset configured to estimate band-to-band tunneling (BBT) current in a circuit element, said TCAD toolset including instructions that, when executed by a processor of said computer, cause the processor to perform operations comprising:

generating a model of the circuit element including a plurality of cells, wherein each cell includes position data and material data corresponding with an associated portion of said circuit element such that said position data defines a spatial position of said each cell within said model corresponding to a spatial positional of said associated portion, and such that said material data operably defines a material composition and corresponding electrical characteristics of said associated portion of said circuit element;

simulating operation of the circuit element including applying a simulated external electric field to a selected cell of said plurality of cells; and utilizing a local BBT modeling function to generate a BBT current estimate, the local BBT modeling function including an exponential factor having a value determined by a difference between said external electric field and a built-in electric field at said selected cell and raised to an exponential power greater than one, wherein the built-in electric field is calculated using said position data and said material data of said plurality of cells, wherein said local BBT modeling function implements said exponential factor such that the BBT current estimate becomes zero when the external electric field is equal to the built-in electric field.

11. The TCAD toolset of claim 10, wherein said exponential factor of said local BBT modeling function is determined using the equation:

$$g = \left(\frac{F - F_1}{F_1}\right)^x$$

wherein g is said exponential factor, wherein F is said external electric field applied to said selected cell, where $F_1$ is said built-in electrical force, and wherein x is said exponential power having said value greater than one.

12. The TCAD toolset claim 11, wherein said exponential power has a value in the range of one and three.

13. The TCAD toolset claim 12, wherein said exponential power has a value equal to one-and-one-half.

14. The TCAD toolset claim 10, wherein said exponential factor g has a value determined by said equation when the external electric field F is greater than the built-in electrical force $F_1$, and wherein said exponential factor g has a value equal to zero when the external electrical force F is less than or equal to the built-in electric field $F_1$.

15. The TCAD toolset claim 14, wherein said built-in electric field $F_1$ is determined by the maximum function:

$$F_1 = \max\left(\tilde{F}_1, \sqrt{C\frac{2qE_gN_{net}}{\varepsilon}}\right)$$

where $\tilde{F}_1$ is a built-in electric field occurring at said selected cell at zero bias, wherein C is a fitting parameter determined by at least one of a structural configuration and an element type of said circuit element, wherein $E_g$ is a bandgap value of said selected cell, wherein $N_{net}$ is a doping concentration of said selected cell, and wherein $\varepsilon$ is a dielectric constant of said selected cell.

16. The TCAD toolset claim 11, wherein utilizing said local BBT modeling function comprises generating said BBT current estimate using the equation:

$$R_{BBT} = -B \cdot |F|^\sigma \cdot \exp\left(-\frac{F_0}{|F|}\right) \cdot g$$

wherein $R_{BBT}$ is said BBT current estimate, wherein B is a temperature-independent pre-factor, wherein $F_0$ is a temperature-dependent bandgap force, and wherein the exponent $\sigma$ has a value in the range of two and two-and-one-half.

17. The TCAD toolset claim 16, wherein the temperature-independent pre-factor B is $4 \times 10^{14}$ $cm^{-1/2} \cdot v^{-5/2}$.

18. The TCAD toolset claim 16, wherein the temperature-dependent bandgap force $F_0$ is proportional to $E_g^{3/2}$, where $E_g$ is the bandgap at the selected element.

19. A computer implemented method for estimating a band-to-band tunneling (BBT) current in a circuit element, the method comprising:

generating, by a processor, a model of the circuit element including a plurality of cells;

simulating operation of the circuit element including applying a simulated external electric field to a selected cell of said plurality of cells; and utilizing a local modeling function to generate a band-to-band tunneling (BBT) current estimate produced in said selected cell, said local BBT modeling function including an exponential factor g having a value determined by the equation:

$$g = \left(\frac{F - F_1}{F_1}\right)^{1.5}$$

wherein g is said exponential factor, wherein F is said external electric field applied to said selected cell, wherein $F_1$ is a built-in electric field is determined by the maximum function:

$$F_1 = \max\left(\tilde{F}_1, \sqrt{C\frac{2qE_g N_{net}}{\varepsilon}}\right)$$

where $\tilde{F}_1$ is a built-in electric field occurring at said selected cell at zero bias, wherein C is a fitting parameter determined by at least one of a structural configuration and an element type of said circuit element, wherein $E_g$ is a bandgap value of said selected cell, wherein $N_{net}$ is a doping concentration of said selected cell, and wherein $\varepsilon$ is a dielectric constant of said selected cell.

20. The method of claim 19, wherein utilizing said local BBT modeling function comprises generating said BBT current estimate using the equation:

$$R_{BBT} = -B \cdot |F|^\sigma \cdot \exp\left(-\frac{F_0}{|F|}\right) \cdot g$$

wherein $R_{BBT}$ is said BBT current estimate, wherein B is a temperature-independent pre-factor, wherein $F_0$ is a temperature-dependent bandgap force, and wherein the exponent $\sigma$ has a value in the range of two and two-and-one-half.

* * * * *